United States Patent
Abe et al.

(10) Patent No.: US 7,373,077 B2
(45) Date of Patent: *May 13, 2008

(54) AUDIO SIGNAL PROCESSING METHOD, AUDIO SIGNAL PROCESSING APPARATUS, HI-FI VIDEO APPARATUS, DIGITAL VIDEO APPARATUS AND 8 MM VIDEO APPARATUS

(75) Inventors: Mototsugu Abe, Tokyo (JP); Akira Inoue, Tokyo (JP); Jun Matsumoto, Kanagawa (JP); Koji Suginuma, Tokyo (JP); Masayuki Nishiguchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 448 days.

This patent is subject to a terminal disclaimer.

(21) Appl. No.: 11/112,399

(22) Filed: Apr. 22, 2005

(65) Prior Publication Data

US 2005/0187776 A1   Aug. 25, 2005

Related U.S. Application Data

(63) Continuation of application No. 09/734,512, filed on Dec. 11, 2000, now Pat. No. 6,961,513.

(30) Foreign Application Priority Data

Dec. 16, 1999 (JP) ............... P11-358117
Dec. 16, 1999 (JP) ............... P11-358118

(51) Int. Cl.
*H04N 7/00* (2006.01)
*H04N 7/64* (2006.01)
(52) U.S. Cl. ......................... 386/96; 386/114
(58) Field of Classification Search ................. 386/96, 386/104, 105, 106, 103, 113, 114, 116, 126, 386/46, 39, 21
See application file for complete search history.

(56) References Cited

U.S. PATENT DOCUMENTS 4,835,758 A * 5/1989 Fujishima ................. 369/53.32
6,775,654 B1 * 8/2004 Yokoyama et al. ......... 704/500

* cited by examiner

*Primary Examiner*—Robert Chevalier
(74) *Attorney, Agent, or Firm*—Sonnenschein Nath & Rosenthal LLP

(57) ABSTRACT

An audio signal processing method for repairing an anomalous state such as noise, a discontinuity, and a break of sound, comprising detecting the anomalous state of an audio signal, deleting the audio signal in the anomalous segment, deducing the correct audio signal by referring to the waveform of the audio signal before and after the deleted segment, generating a repair signal for repairing the signal in the deleted segment based on the deduced result, inserting the repair signal into the deleted segment, and connecting it to the audio signal before and after the deleted segment.

1 Claim, 25 Drawing Sheets

EXAMPLE OF INPUT WAVEFORM

DELETE ANOMALY

DETECT PSEUDO WAVEFORM

CONNECT WAVEFORM

DETECT PSEUDO WAVEFORM

SHIFT WAVEFORM

PREPARE AND INSERT SIMILAR WAVEFORM

TRACK STRUCTURE OF DIGITAL VIDEO TAPE

HIGH SPEED REPRODUCTION SCANNING OF DIGITAL VIDEO TAPE

SCHEMATIC VIEW OF MAGNETIC DISK APPARATUS

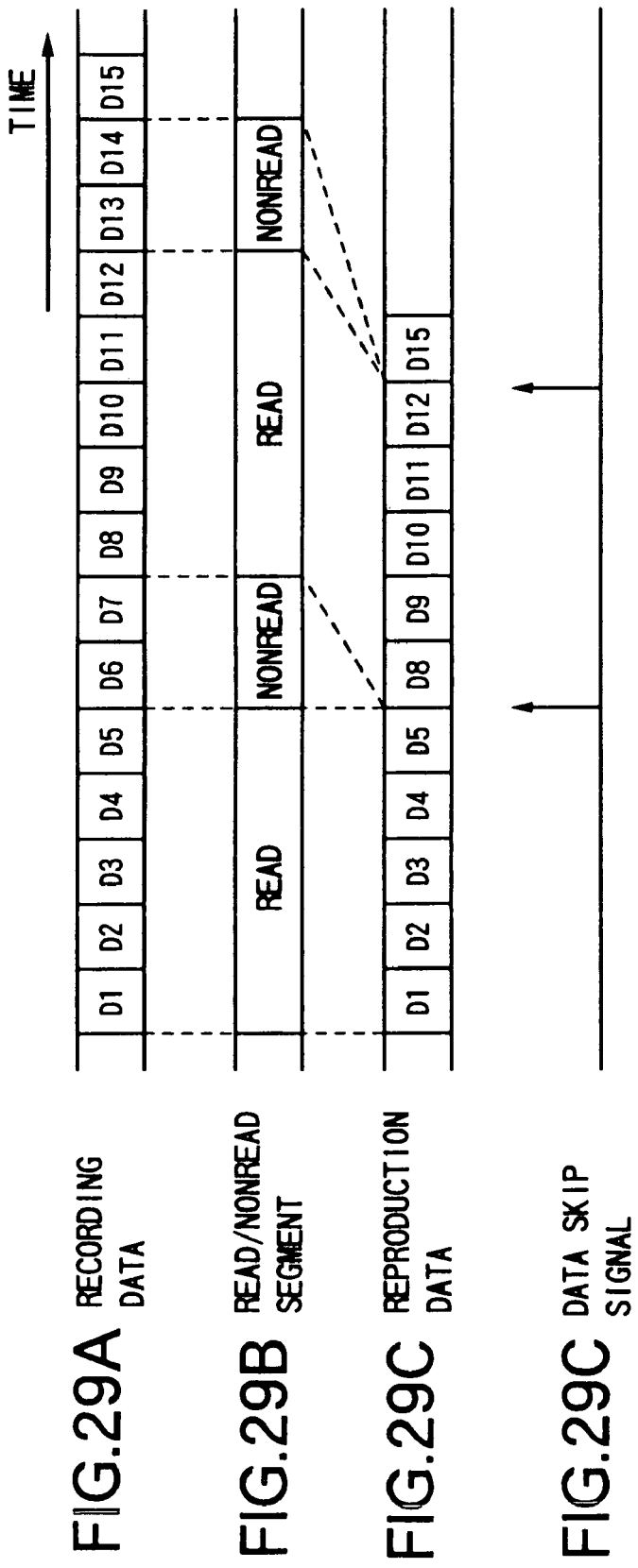

AUDIO SIGNAL PROCESSING METHOD, AUDIO SIGNAL PROCESSING APPARATUS, HI-FI VIDEO APPARATUS, DIGITAL VIDEO APPARATUS AND 8 MM VIDEO APPARATUS

RELATED APPLICATION DATA

This application is a continuation of U.S. Ser. No. 09/734,512, filed Dec. 11, 2000, now U.S. Pat. No. 6,961,513, incorporated herein by reference, which claims priority to Japanese Application No. P11-358117, filed Dec. 16, 1999 and Japanese Application No. P11-358118, filed Dec. 16, 1999, all of which are incorporated herein by reference to the extent permitted by law.

BACKGROUND OF THE INVENTION

1. Field of the Invention

The present invention relates to a method and apparatus for processing an audio signal and apparatuses using the same. More particularly, the present invention relates to a method an apparatus for eliminating shot noise, discontinuity, and a data loss and repairing an audio signal and apparatuses using the same.

The present invention is applied to compensation for loss of sound occurring when performing high speed reproduction (special reproduction) etc. in a receiver of a broadcasted audio signal, a reproduction system of an audio signal recorded on a magnetic tape, an optical disk, an opto-magnetic disk, or the like, and a decoding system of a digitally transmitted audio signal, for example, a Hi-Fi video apparatus, a digital video apparatus (digital video signal recording and/or reproducing apparatus), and an 8 mm video apparatus.

2. Description of the Related Art

In a receiver of a broadcasted audio signal, a reproduction system of an audio signal recorded on a magnetic tape, optical disk, opto-magnetic disk, or the like, a decoder of a digitally transmitted audio signal, etc., there is sometimes shot noise, discontinuity of data, and data loss—frequently occurrences in a communication path, a recording apparatus, a reproducing apparatus, packet communication, etc.

Such noise is generated everywhere due to, for example, noise generated in the air or in the apparatus, scratches or dust on the magnetic tape, scratches or dust on the optical disk, scratches or dust on an analog record disk, and reading error of the reproducing apparatus. Such noise causes a remarkably incongruity in sound.

In the past, when such noise and discontinuity occurred, the method of reducing the noise component by a low pass filter, a high pass filter, or the like and the method of replacing segments of data loss by the signal before and after them (Japanese Unexamined Patent Publication (Kokai) No. 9-274772) have been tried. Further, particularly, when digital data is used, the noise and the discontinuity have been reduced by means of prevalue hold, mean value interpolation, attenuation interpolation, muting, or the like However, a frequency filter distorts the normal signal portion as well and further is not that effective in elimination of short time and wide frequency band signals such as shot noise and discontinuity.

Further, prevalue hold and mean value interpolation are problematic in that a discontinuity newly occurs with the preceding and following data, so incongruity in sound is newly caused.

As concrete audio signal processing apparatuses, related art of Hi-Fi video apparatuses, digital video signal recording and/or reproducing apparatuses, 8 mm video apparatuses, etc. and problems thereof will be explained.

A Hi-Fi video apparatus using a magnetic tape has, as illustrated in FIG. 3, two tracks, that is, a fixed audio track and a Hi-Fi audio track, as tracks for recording an audio signal on the magnetic tape.

The fixed track is oriented parallel to the tape running direction and is provided at a position independent from the video signal track. It is scanned by a fixed head 17 illustrated in FIG. 2 and has a low dynamic range, a low frequency range, and a high noise level in structure. It is usually used for only monaural recording.

The Hi-Fi track is helically scanned by a rotary head drum 16 illustrated in FIG. 2 and records an audio signal by deep layer recording etc.* at the same position as the video track. It has a high dynamic range, a high frequency range, and a low noise level and is usually used for stereo recording.

In general, the Hi-Fi track is used for high quality sound reproduction at the time of normal reproduction, while the fixed track is used for low quality sound reproduction at the time of special (high speed) reproduction.

For example, Japanese Unexamined Patent Publication (Kokai) No. 5-292449 discloses a method of reproducing a video signal recorded on a video track at an (N+1)/N speed. However, the fixed track has to be used for reproduction of the audio signal. The reason for this is that, as shown in FIG. 4, at the time of special reproduction, the rotary head scans a plurality of Hi-Fi tracks by obliquely traversing them (helically scans them), so the video signal can be reproduced as one image by combining a plurality of fields, but, in contrast, noise due to discontinuity of the scanning of the rotary head frequently occurs in the audio signal to cause remarkable incongruity in sound, so the Hi-Fi track cannot be used. Therefore, the Hi-Fi track is not used. Instead, the fixed track is used using the fixed head 17—which is free from the problem of discontinuous scanning of the head.

In high speed reproduction for a head search or the like, in the case of high speed reproduction at 2× speed or more, a high quality of sound is not always required, so there is little problem.

However, when trying to save time while fully viewing and listening to the content by reproduction at a slightly high speed, for example, a 1.2× speed, the quality of sound when reproducing the audio signal recorded on the fixed audio track, which is fixed to such high speed reproduction, is insufficient. Therefore, utilization of the Hi-Fi audio track providing a high quality audio signal has been demanded.

In a digital video signal recording and/or reproducing apparatus using a magnetic tape, when giving as an example the format of for example a consumer digital video system, as shown in FIG. 24, a helical track inclined with respect to the tape running direction is divided into units of blocks. A compressed and encoded video signal is recorded at the center, while the audio signal and auxiliary signals are recorded on the two sides.

At the time of high speed reproduction in the digital video signal recording and/or reproducing apparatus, as shown in FIG. 25, a skip in the middle of a track is avoided by an auto-tracking mechanism. However, the discontinuity of the audio signal occurring due to the tracks not being read at the time of high speed reproduction causes a remarkable incongruity in sound at the time of reproduction in the same way as the case of a Hi-Fi video apparatus.

As the audio signal processing for reducing such incongruity in sound at the time of high speed reproduction in such a digital video signal recording and/or reproducing apparatus, various countermeasures have been considered heretofore. Examples thereof will be explained below.

(1) The method of permitting the discontinuity and connecting the signal as it is (Japanese Patent No. 2,687.706), (2) The method of muting the discontinuous portion, (3) The method of changing the speed of the rotary head to match the tape running speed and reading all data (Japanese Patent No. 2,766,065), (4) The method of replacing the lost portions of the audio signal by the data before and after it (Japanese Unexamined Patent Publication (Kokai) No. 9-274772), and (5) The method of connecting the audio signal before and after a lost portion by a cross fading (Japanese Patent No. 2,737,182).

With the methods of (1) and (2), however, discontinuity- or muting periodically occurs, so the incongruity cannot be solved.

With the method of (3), the apparatus becomes complex and further the data becomes too large, so time compression and sampling rate conversion are necessary. As a result, a new incongruity in sound such as a rise in sound pitch is caused.

With the method of (4), although there is the effect of reduction of the incongruity without muting the frames from which data has been lost, discontinuity still occurs before and after the replaced data. Accordingly, there is a problem of how to repair the audio signal without incongruity.

With the method of (5), although the discontinuity is solved by a cross fading of the data before and after the discontinuity, this is done without considering waveform periodicity etc., so there is a problem in that incongruity due to mismatch of phase is newly caused.

An 8 mm video apparatus recording and reproducing an audio signal by a rotary head suffers from problems similar to those described above.

A magnetic recording apparatus using not magnetic tape, but a fixed disk is excellent in random accessability, so the problem such as the skip of a track due to the physical structure described above does not occur. However, a certain time is required for reading data. Therefore, at the time of high speed reproduction, it is sometimes necessary to deliberately reduce the number of read fields. At this time, the problem of discontinuity of sound similar to the above arises.

SUMMARY OF THE INVENTION

An object of the present invention is to provide an audio signal processing method and apparatus for eliminating shot noise and smoothly interpolating discontinuity of an audio signal without distorting a normal portion and thereby reducing the incongruity in sound and apparatuses using the same.

Another object of the present invention is to provide a method an apparatus for processing a reproduced audio signal to an audio signal free from incongruity in sound at the time of high speed reproduction in a magnetic tape type audio signal reproducing apparatus reproducing an audio signal recorded by helical scanning of a rotary audio head on a magnetic tape such as a Hi-Fi video apparatus, digital video signal recording and/or reproducing apparatus, and 8 mm video apparatus and such apparatuses using the same.

Still another object of the present invention is to provide a method and apparatus for processing a reproduced audio signal to an audio signal free from incongruity in sound at the time of high speed reproduction in a rotary audio signal reproducing apparatus reproducing an audio signal recorded on a substantially randomly accessible rotary recording medium such as a magnetic disk, optical disk, and opto-magnetic disk and such apparatuses using the same.

According to a first aspect of the present invention, there is provided an audio signal processing method comprising the steps of deleting an audio signal in an anomalous segment, deducing a correct audio signal by referring to the waveform of the audio signal before and after the deleted segment, generating a repair signal for repairing the signal of the deleted segment based on the deduced result, inserting the repair signal into the deleted segment, and connecting the same with the audio signal before and after the deleted segment.

Preferably, the method further comprises detecting an anomalous state of the audio signal and performing the above processing when detecting the anomalous state.

Preferably, the method further comprises evaluating the similarity of signal waveform before and after the deleted segment in the step of deducing the audio signal, generating the repair signal by the waveform with the greatest similarity in the step of generating the repair signal, and smoothly connecting the inserted repair signal and the audio signal before and after the deleted segment in the step of connecting the audio signal.

Further preferably, the method further comprises measuring and successively adding a time discrepancy between a segment with the waveform connected by using the repair signal and a segment with the anomalous signal deleted therefrom and performing the processing of the deducing step, repair signal generation step, and signal connection step again when a sum of the time discrepancy exceeds a constant time discrepancy so as to adjust the time discrepancy.

Preferably, the method further comprises calculating a correlation function for the audio signal before and after the deleted segment in the step of deducing the audio signal and evaluating the similarity by referring to the calculated correlation function.

Alternatively, the method further comprises calculating a correlation function for the audio signal before and after the deleted segment in the step of generating the repair signal and cross fading the audio signal or cross fading the audio signal before and after the deleted segment to smoothly connect it in the step of connecting the audio signal.

The method may detect the anomalous state by detecting skip scanning of a reading means when reading an audio signal from a recording medium.

Alternatively, it may detect the anomalous state by statistically processing the audio signal and detecting a sudden fluctuation in the audio signal.

According to a second aspect of the present invention, there is provided an audio signal processing method comprising the steps of deleting an audio signal of a noise segment of noise and discontinuity due to shot noise superposed on the audio signal or a signal skip, evaluating a similarity of signal waveform before and after the noise segment, and smoothly connecting waveforms to give a maximum similarity.

According to a third aspect of the present invention, there is provided an audio signal processing apparatus utilizing the above audio signal processing methods.

The audio signal processing apparatus comprises a signal deleting means for deleting an audio signal of an anomalous segment, a deducing means for deducing a correct audio signal by referring to waveform of the audio signal before and after the deleted segment, a repair signal generating means for generating a repair signal for repairing the signal of the deleted segment based on the deduced result, and a signal connecting means for inserting the repair signal into the deleted segment and connecting the same with the audio signal before and after the deleted segment.

The audio signal processing apparatus may further comprise an anomaly detecting means for detecting an anomalous state of the audio signal and performing the processing when detecting the anomalous state. The anomalous state is generated at for example a track skip at the time of high speed reproduction or switching of the rotary head in a Hi-Fi video apparatus.

When detecting the anomalous state, the apparatus deletes the audio signal of the anomalous state portion. Then, considering the continuity of the audio signal, it deduces the audio signal of the deleted portion by referring to the audio signal before and after the deleted portion. Next, it generates a repair signal corresponding to the correct audio signal. Finally, it inserts the repair signal into the deleted segment and connects it to the audio signal before and after the deletion.

The present invention may be applied to a Hi-Fi video apparatus, digital video apparatus (digital video signal recording and/or reproducing apparatus), 8 mm video apparatus, magnetic disk apparatus, etc.

As a result, even in the case of high speed reproduction in for example a Hi-Fi video apparatus and 8 mm video apparatus, a high quality Hi-Fi audio signal can be reproduced. Further, pulse noise generated at the time of high speed reproduction of a digital video apparatus is reduced, the incongruity in sound is reduced, and high quality reproduction becomes possible.

For example, in a Hi-Fi video apparatus, even when trying to save time while fully viewing and listening to the content by reproduction at 1.2× speed, a high quality audio signal can be reproduced. In a magnetic disk apparatus, it becomes possible to obtain a greater margin in the access time and therefore perform time division processing with other tasks without-exceeding the limit of the access time.

BRIEF DESCRIPTION OF THE DRAWINGS

These and other objects and features of the present invention will become clearer from the following description of the preferred embodiments given with reference to the attached drawings, in which:

FIGS. 7A to 7C are views of a rotary head switch operation in a Hi-Fi video apparatus, in which FIG. 7A is a view of a recording track, a used head, and an azimuth thereof, FIG. 7B is a view of a rotary head pulse and a track skip pulse at the time of high speed reproduction, and FIG. 7C is a view of a reproduction track, a used head, and the azimuth thereof by a head switch operation;

FIGS. 29A, 29B, 29C, and 29D are graphs of the operation timing of the magnetic disk apparatus of FIG. 28.

DESCRIPTION OF THE PREFERRED EMBODIMENTS

First, preferred embodiments of the audio signal processing method and apparatus of the present invention will be explained.

Note that the gist of the present invention resides in the processing for repairing anomaly of an audio signal—not the recording of the audio signal. Similarly, processing of a video signals is not its gist. Accordingly, so far as they do not particularly relate to the present invention, the recording of an audio signal and the processing of a video signal will not be referred to.

However, the present invention is not limited to only an audio signal reproducing apparatus. The present invention can also be applied to a digital video signal recording and/or reproducing apparatus using the audio signal processing method and apparatus of the present invention and an audio signal and/or video signal recording and/or reproducing apparatus using the audio signal processing method and apparatus of the present invention.

First Example of Hi-Fi Video Apparatus

As a first embodiment of use of the audio signal processing apparatus of the present invention, a first example of a Hi-Fi video apparatus will be explained by referring to FIG. 1 to FIG. 8.

Figure 1:
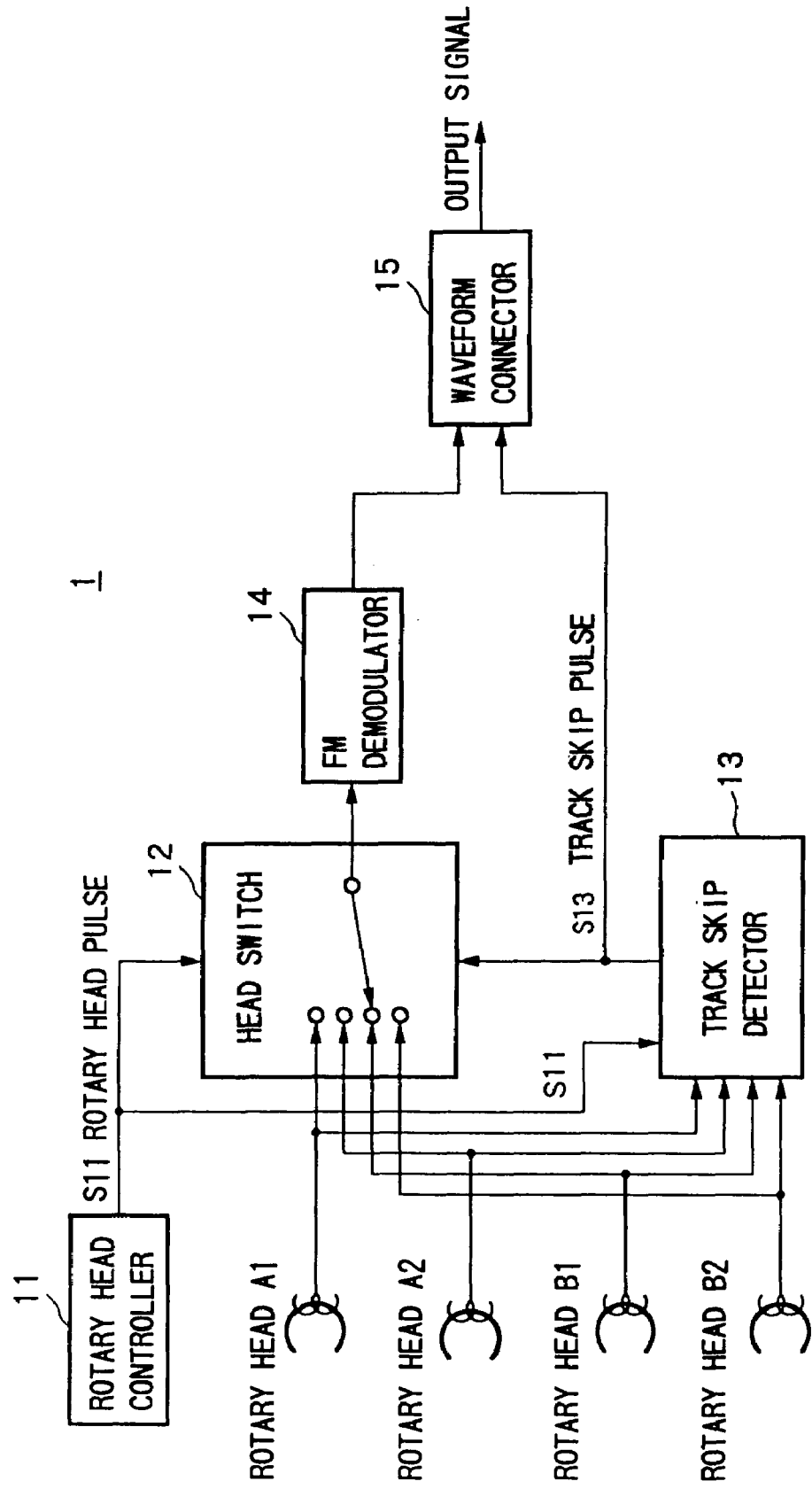
FIG. 1 is a schematic view of the configuration of a first example of a Hi-Fi video apparatus according to an embodiment of the present invention.
Figure 2:
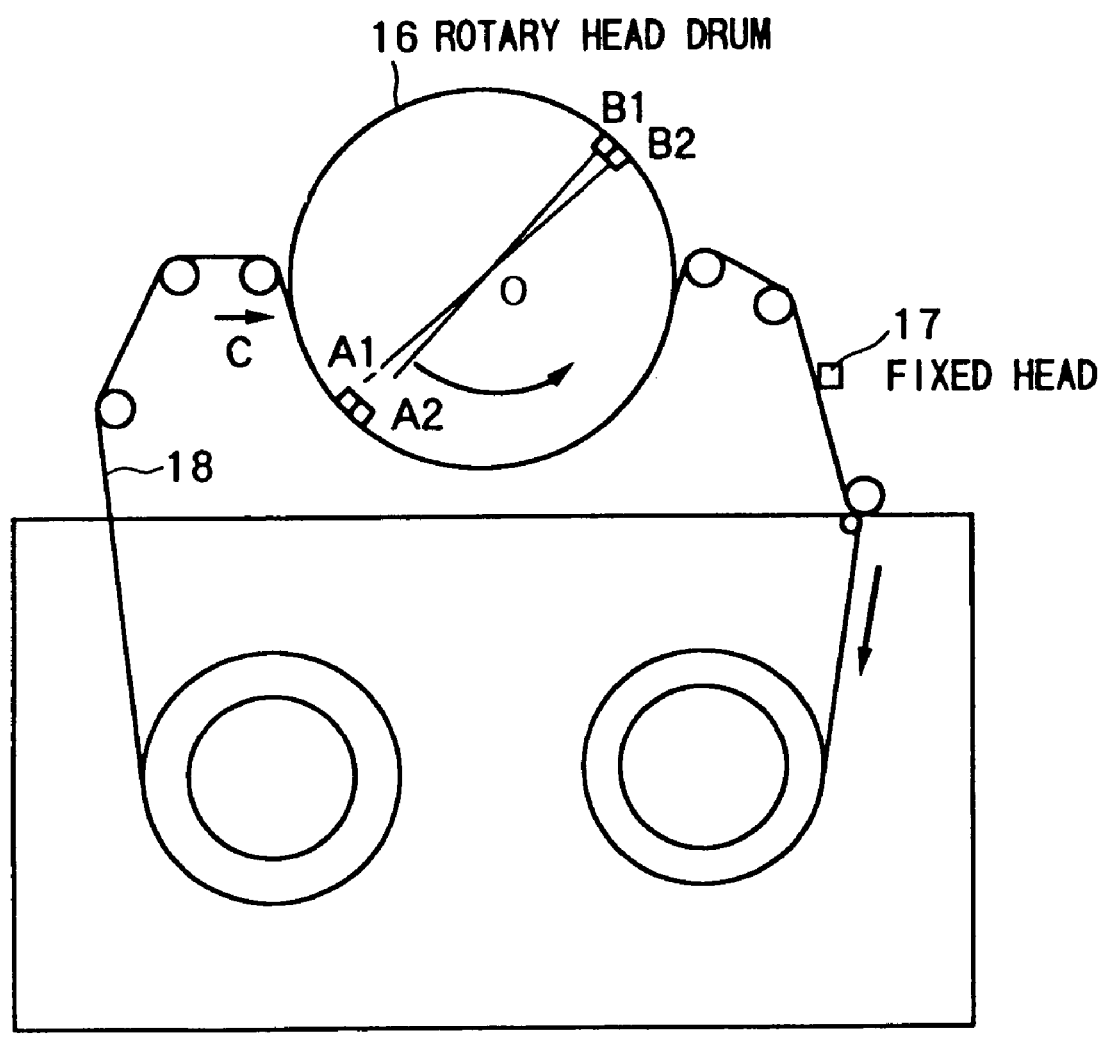
FIG. 2 is a schematic view of tape running and a rotary head of the Hi-Fi video apparatus illustrated in FIG. 1.

FIG. 1 is a view of the configuration of a Hi-Fi video apparatus according to the first embodiment of the present invention, while FIG. 2 is a schematic view of tape running and a rotary head of the Hi-Fi video apparatus illustrated in FIG. 1.

The Hi-Fi video apparatus 1 has a rotary head controller 11, a head switch 12, a track skip detector 13, an FM demodulator 14, a waveform connector 15, a rotary head drum 16 with rotary heads A1 and A2 and B1 and B2 mounted thereon, a fixed head 17, a not illustrated rotation drive controller of the rotary head drum 16, a not illustrated running drive controller of a magnetic tape 18, a not illustrated audio signal reproducing apparatus, and a not illustrated video signal reproducing apparatus.

The rotation drive controller of the rotary head drum 16, the running drive controller of the magnetic tape 18, the audio signal reproducing apparatus, and the video signal reproducing apparatus are not directly related to the present invention, so the illustration was omitted, but they are similar to those in the well known apparatuses.

The Hi-Fi video apparatus 1 records an audio signal and a video signal on the magnetic tape 18 and reproduces the audio signal and the video signal recorded on the magnetic tape 18 by helical scanning using the rotary head drum 16 with the rotary heads A1, A2, B1, and B2.

Figure 3:
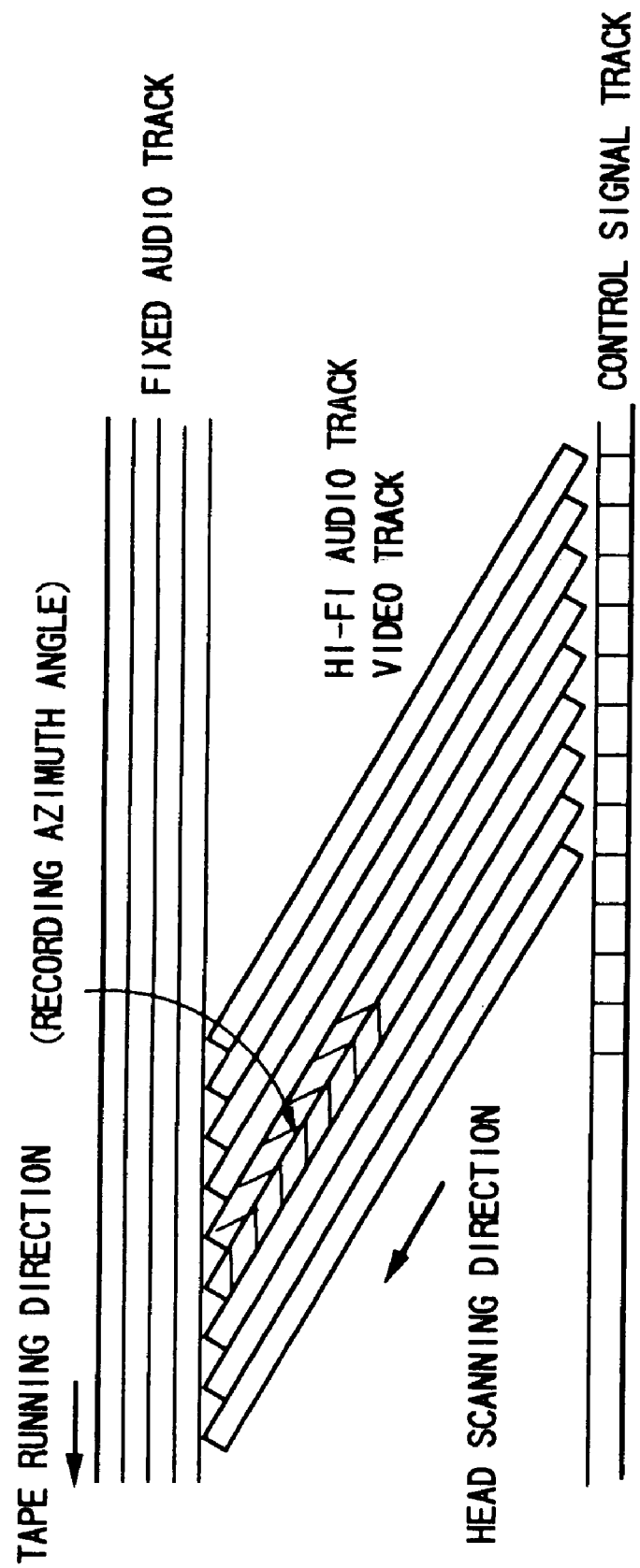
FIG. 3 is a view of a track structure of a tape recording surface of a magnetic tape in the Hi-Fi video apparatus illustrated in FIG. 1.

FIG. 3 is a view of a track structure of the tape recording surface in the Hi-Fi video apparatus.

A pair of rotary heads A1 and A2 and a pair of rotary heads B1 and B2 shown in FIG. 1 are arranged, as shown in FIG. 2, at positions rotationally symmetric with respect to a center O of the rotary head drum 16, that is, facing positions 180 degrees apart, at the rotary head drum 16. The rotary heads A1 and A2 are arranged at adjacent positions and have azimuth angles reverse to each other. Also, the rotary heads B1 and B2 are similarly arranged at adjacent positions and have azimuth angles reverse to each other. The rotary heads A1 and B2 and the rotary heads A2 and B1 are given the same azimuth angles. This arrangement is called a double azimuth type. As will be explained later, such a configuration is employed at the time of high speed reproduction so that the reproduction head scans the recorded track at a different azimuth angle from that at the time of recording.

The rotary head controller 11, head switch 12, track skip detector 13, FM demodulator 14, and the waveform connector 15 will be briefly explained next.

The rotary head controller 11 controls a not illustrated drive system so as to rotate the rotary head drum 16 at a designated speed. At the same time, it generates a rotary head pulse S11 whenever the rotary heads A1 and B1 pass an origin C illustrated in FIG. 2 and outputs it to the head switch 12.

The track skip detector 13 compares the signal levels of the signals obtained from the rotary heads A1, A2, B1, and B2 to monitor if the rotary head having the maximum signal level changes from the rotary head A1 to A2, from the rotary head A2 to A1, from the rotary head B1 to B2, or from the rotary head B2 to B1. Where it detects a change of the rotary heads, it concludes there was a track skip, generates a track skip pulse S13 at that time, and outputs the track skip pulse to the head switch 12 and the waveform connector 15.

The head switch 12 receives as its inputs the detection signals of the rotary heads A1, A2, B1, and B2 and selects one of the detection signals of the rotary heads A1, A2, B1, and B2 in accordance with the rotary head pulse S11 from the rotary head controller 11 and the track skip pulse S13 from the track skip detector 13.

The rotary head pulse S11 output from the rotary head controller 11 is the signal detecting the passage of the rotary head drum 16 through the position C, so indicates one revolution of the rotary head drum 16. It is also the signal for discriminating the positions of the pair of rotary heads A1 and A2 and the pair of rotary heads B1 and B2. On the other hand, the track skip pulse S13 detected at the track skip detector 13 is a signal indicating that the rotary heads A1 and A2 or the rotary heads B1 and B2 skipped a track in the magnetic tape 18. Accordingly, the head switch 12 switches between the rotary heads An and B by the rotary head pulse S11 from the rotary head controller 11 and switches between the rotary heads 1 and 2 by the track skip pulse S13 from the track skip detector 13. Note that, the rotary head A indicates the rotary heads A1 and A2, and similarly the rotary head B indicates the rotary heads B1 and B2. Further, the rotary head 1 indicates the rotary heads A1 and B1, and the rotary head 2 indicates the rotary heads A2 and B2.

The FM demodulator 14 demodulates the audio signal selected at the head switch 12 and inputs the same to the waveform connector 15.

The waveform connector 15 smoothly connects the signal FM demodulated at the FM demodulator 14 while maintaining the continuity and outputs the same as the repaired audio signal to deal with the anomalous state such as the discontinuity of the signal or skip or noise from the timing based on the track skip pulse S13 detected at the track skip detector 13.

Details of the high speed reproduction operation of the Hi-Fi video apparatus 1 will be explained next.

Track Skip Detector

FIG. 3 is a view of the track structure of the tape recording surface of the magnetic tape 18 of a Hi-Fi video apparatus.

Figure 4:
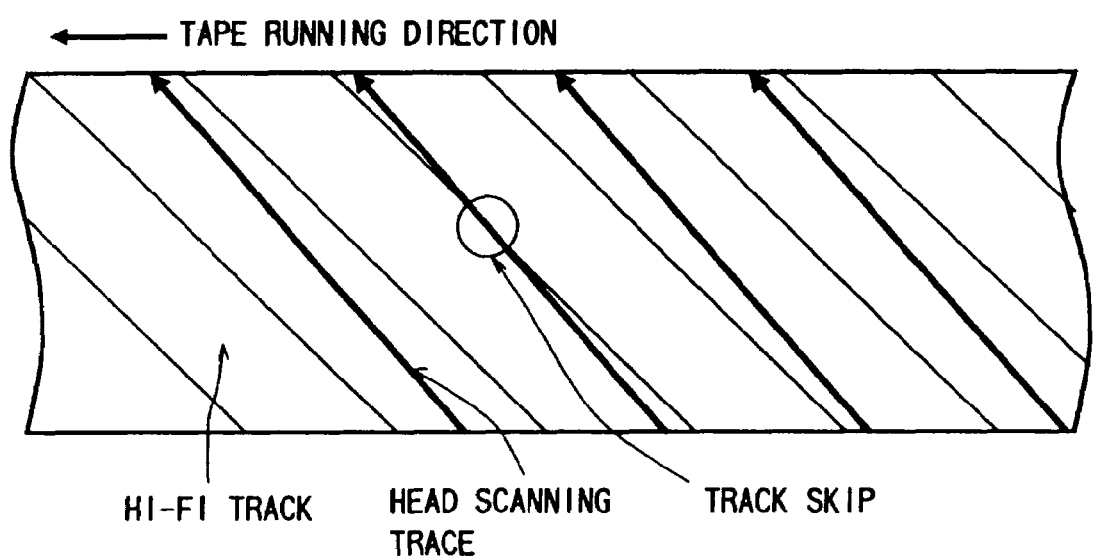
FIG. 4 is a view of a trace of a head when reproducing a video Hi-Fi audio track of the magnetic tape illustrated in FIG. 3 at the time of high speed reproduction.

FIG. 4 is a view of the trace of the head at the time of high speed reproduction of the video Hi-Fi audio track of the magnetic tape 18 illustrated in FIG. 3.

Figure 5:
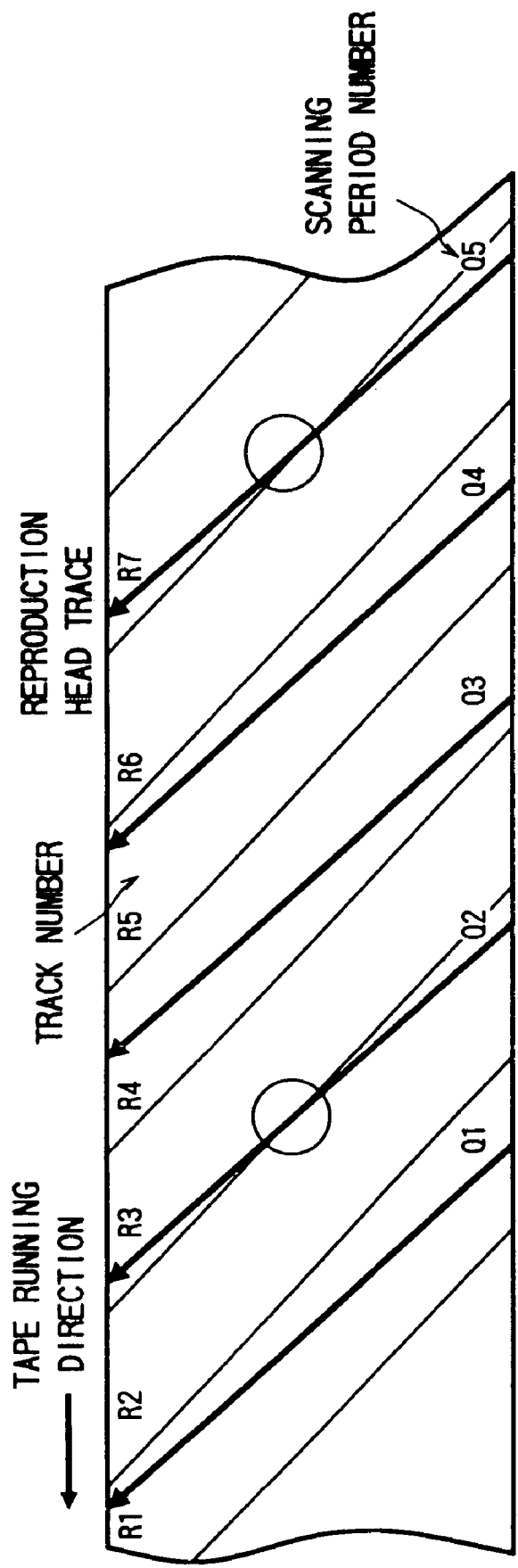
FIG. 5 is a view of details of the track structure of the magnetic tape of the Hi-Fi video apparatus illustrated in FIG. 1 and a head trace at the time of high speed reproduction.

FIG. 5 is a view of the track structure of the magnetic tape 18 and the head trace at the time of high speed reproduction. Symbols R1 to R7 shown in FIG. 5 are track numbers attached for convenience for the explanation of the present embodiment, while symbols Q1 to Q7 are scanning numbers attached for convenience for the explanation of the present embodiment The track skip detector detects the time of occurrence of a track skip indicated by a mark O at the time of high speed reproduction as shown in FIG. 4 and FIG. 5, generates a track skip pulse S13 at that time, and outputs the track skip pulse S13 to the head switch 12 and the waveform connector 15.

The principle of generation the track skip pulse S13 in the track skip detector 13 will be explained next.

In the helical scanning of the Hi-Fi video tape shown in FIG. 3, as partially indicated by hatching in the track, the recording azimuth angles of the adjoining tracks are different. In the case of for example a VHS Hi-Fi video, an angle of +30 degrees is given for every track. When head scanning over a plurality of tracks as shown in FIG. 4 and FIG. 5, the azimuth angle of the recording surface becomes reverse at the time when the track skip indicated by the mark O occurs, the angle of the head in use loses compatibility, and the other head forming the pair becomes compatible. Due to this, the magnitudes of the output levels of the paired (A1 and A2 and B1 and B2) heads are switched with each other.

Figure 6:
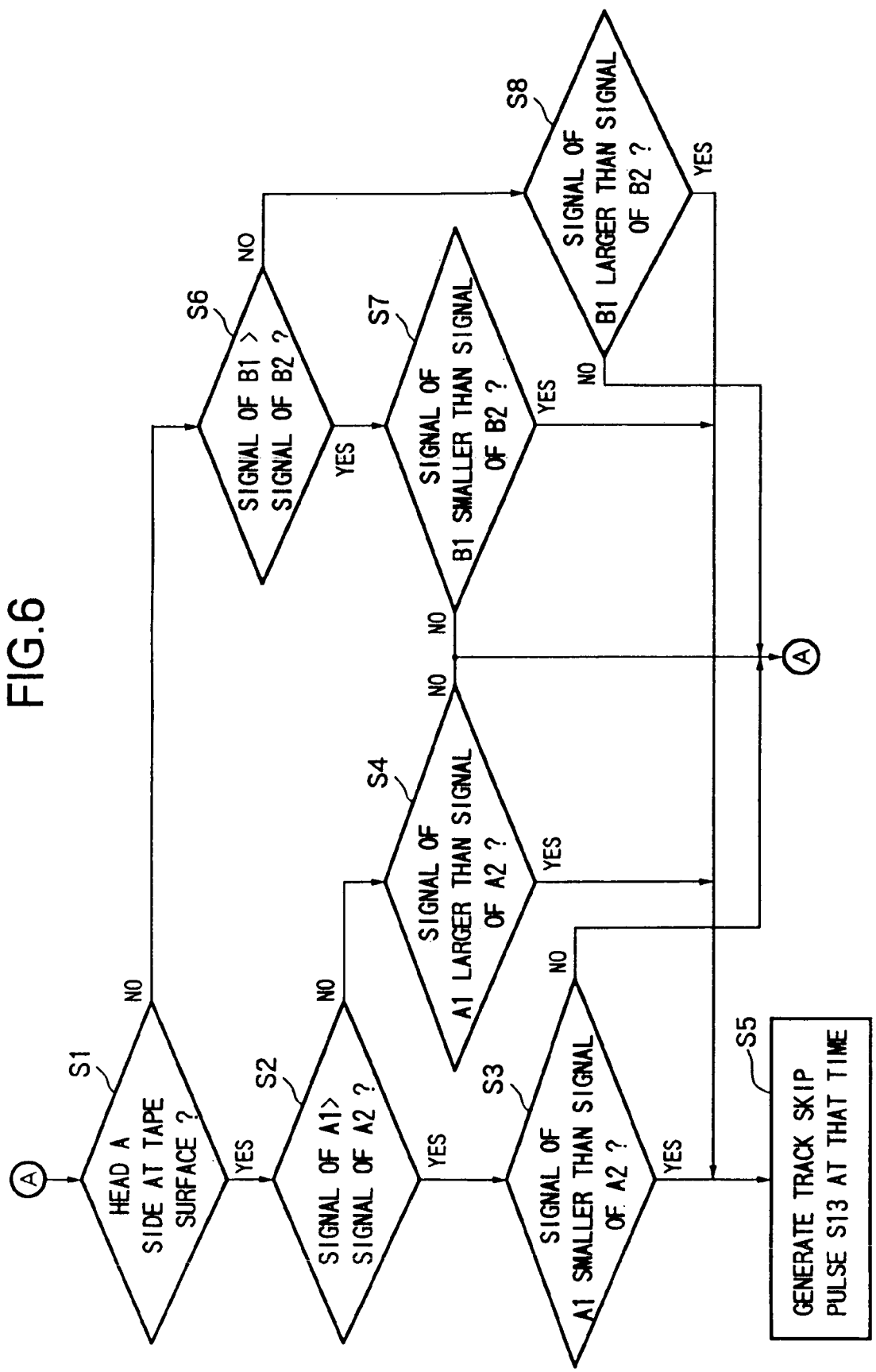
FIG. 6 is a flow chart of an operation of a track skip detector illustrated in FIG. 1.
Figure 7:
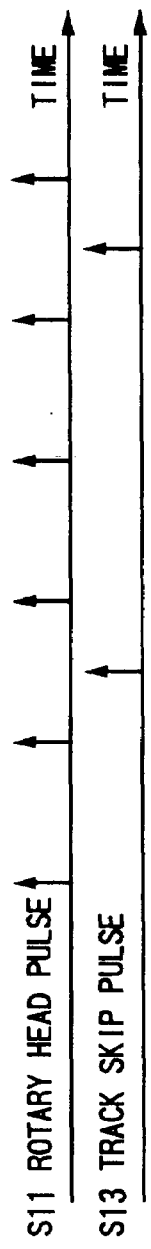

FIG. 6 is a flow chart of the processing of the track skip detector 13.

The track skip detector 13 follows the above principle of detection and refers to the rotary head pulse S11 from the rotary head controller 11 to judge whether the rotary heads A1 and A2 are located at the tape surface of the magnetic tape 18 or the rotary heads B1 and B2 are located at the tape surface of the magnetic tape 18 (S1). When the rotary heads A1 and A2 are located at the tape surface of the magnetic tape 18, it compares the signal levels of the rotary heads A1 and A2. When detecting that they are replaced with heads outputting signals having a larger level (S2, S4: S2, S4), it generates the track skip pulse S13 (S5). Similarly, when the rotary heads B1 and B2 are located on the tape surface of the magnetic tape 18, it compares the signal levels of the rotary heads B1 and B2. When detecting that they are replaced with heads outputting signals having a larger level (S6 to S8), it generates the track skip pulse S13 (S5)

FIGS. 7A to 7C are graphs showing the rotary head switch operation.

The track skip pulse S13 may be a single pulse in the head switch 12 as illustrated in FIG. 7B. However, the waveform connector 15 explained later requires the time when the track skip was generated. Therefore, the track skip pulse S13 to be given to the head switch 12 is made a one-pulse signal as illustrated in FIG. 7B. On the other hand, as the track skip pulse S13 to be given to the waveform connector 15, other than the one-pulse signal, the track skip generation time is informed. Alternatively, only a one-pulse signal is given to the waveform connector 15 and the time when receiving the track skip pulse S13 is stored in the waveform connector 15. In the present embodiment, as will be explained later by referring to FIG. 9 and FIG. 10, the case is illustrated where, when one pulse of the track skip pulse S13 is supplied from the track skip detector 13 to the waveform connector 15, a buffer controller 1551 in the waveform connector 15 sets the position anomaly flag indicating that time in a signal buffer 152.

Rotary Head Switch

The rotary head switch 12 receives as its input the rotary head pulse S11 output from the rotary head controller 11 and the track skip pulse S13 output from the track skip detector 13 and switches the detection signals of the reproduction heads A1, A2, B1, and B2.

At the time of recording, as illustrated in FIG. 7A, the data is recorded by azimuth angles alternating for every track by using the rotary heads A1 and B1 having reverse azimuths located at facing positions. Namely, as illustrated in FIG. 5, the audio signal is recorded on a track R1 by the rotary head A1 with a positive azimuth (for example +30 degrees), and audio signal is recorded on a track R2 by the rotary head B1 with a negative azimuth (for example −30 degrees). The audio signal is then alternately recorded in a similar way to that described above. Note that an explanation of the recording of the video signal is omitted.

At the time of normal reproduction of the recorded audio signal, in the same way as the time of recording explained above by referring to FIG. 7A, the data is reproduced by azimuth angles alternating for every track by using the rotary heads A1 and B1 having the reverse azimuths located at facing positions.

At the time of recording in the Hi-Fi video apparatus 1 of the present embodiment, the operation at the time of normal reproduction is similar to the operation of the usual well known Hi-Fi video apparatus.

At the time of high speed reproduction, as illustrated in FIG. 7B, the rotary head controller 11 generates the rotary head pulse S11 at the time when the reproduction head trace returns to the lowermost end and the track skip detector 13 generates the track skip pulse S13 at the position of the track skip given the mark O in FIG. 5.

FIG. 7C is a graph of the head switch operation in the head switch 12.

Figure 8:
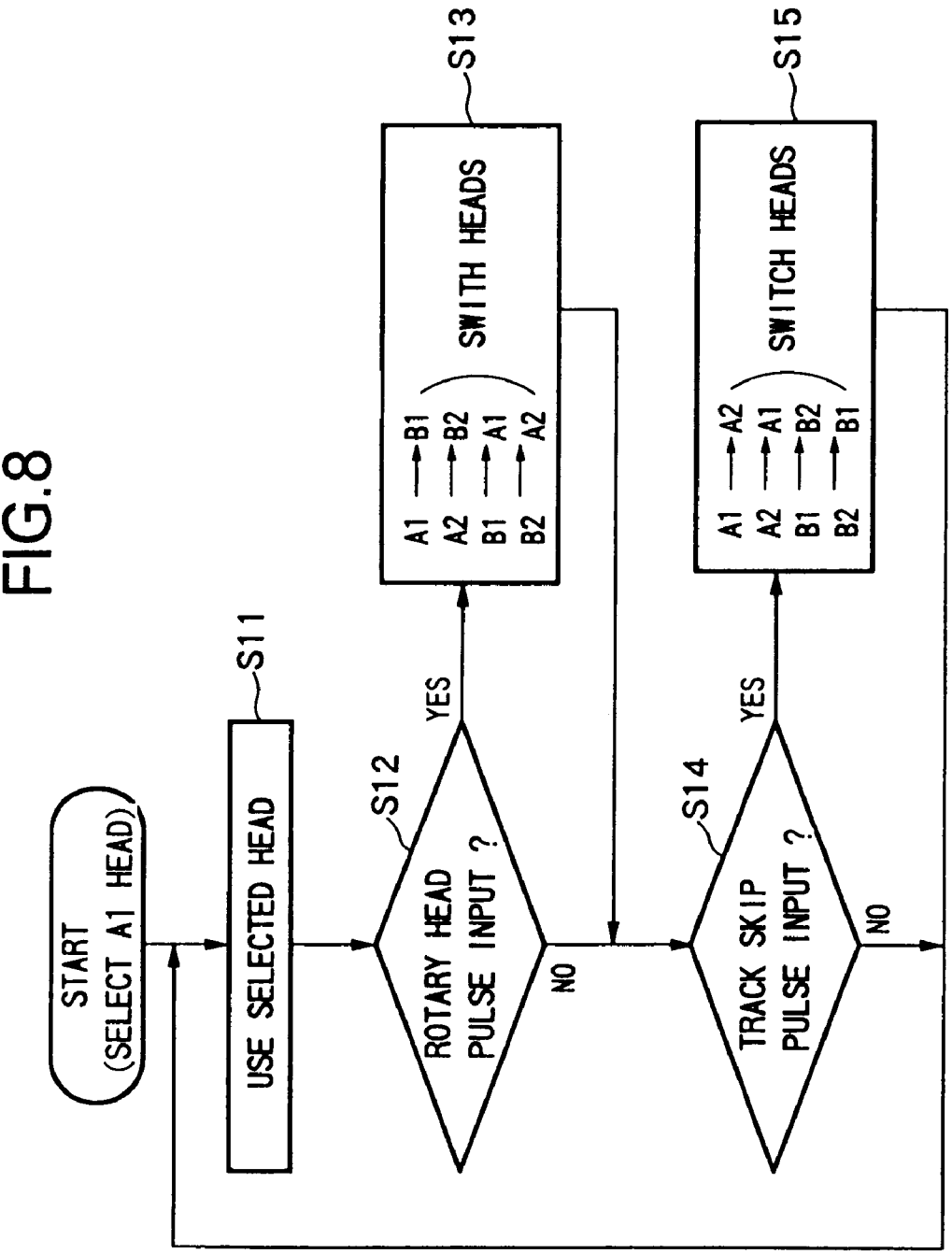
FIG. 8 is a flow chart of the rotary head switch operation in a head switch illustrated in FIG. 1.

FIG. 8 is a flow chart of the rotary head switch operation in the head switch 12.

The rotary heads "A" and "B" in the head switch 12 are switched at the timing of generation of the rotary head pulse S11 output from the rotary head controller 11, while the rotary heads "1" and "2" in the head switch 12 are switched matching with the timing of the generation of the track skip pulse S13 in the track skip detector 13.

For example, as exemplified in FIG. 7C, the head switch first uses the rotary heads (A1, B1) (step 11 in FIG. 8). In a scanning period Q1, it scans the R1 track (positive azimuth) by the rotary head A1 (positive azimuth).

When the rotary head A1 finishes scanning the R1 track and shifts to the R2 track, the head switch 12 switches the rotary head A1 to the rotary head B1 (step 13) matching with the reception of the rotary head pulse S11 from the rotary head controller 11 (FIG. 8, step 12).

In a scanning period Q2, the scanning of the R2 track (negative azimuth) is started by the rotary head B1 (negative azimuth), but a skip to an R3 track (positive azimuth) occurs in the middle. The head switch 12 switches the use of the rotary heads (A1, B1) to the use of the rotary heads (A2, B2) (step 15) at the time of generation of the track skip pulse S13 from the track skip detector 13 (step 15) and scans the remainder of the R3 track (positive azimuth) by the rotary head B2 (positive azimuth).

In a scanning period Q3, an R4 track (negative azimuth) is scanned by the rotary head A2 (negative azimuth). In a scanning period Q4, an R5 track (positive azimuth) is scanned by the rotary head B2 (positive azimuth).

In a scanning period Q5, an R6 track (negative azimuth) is scanned by the rotary head A2 (negative azimuth), a switch is made to the use of the rotary heads (A1, B1) matching with the generation of the track skip pulse S13, and an R7 track (positive azimuth) is scanned by the rotary head A1 (positive azimuth).

The head switch 12 repeats the above operations. Note that, along with the switching of the rotary heads in the head switch 12, a pulse-like noise is sometimes generated. This noise is one of the anomalous signals of the present invention.

Due to the above operation, the head switch 12 transmits the detection signals of the rotary heads A1, A2, B1, and B2 compatible with the operation (scanning) of the rotary heads A1, A2, B1, and B2 at the time of high speed reproduction to the FM demodulator 14.

The FM demodulator 14 demodulates the audio signals transmitted from the head switch 12 by a well known method.

Waveform Connector (First Embodiment)

The waveform connector 15 of the first embodiment of the audio signal processing method of the present invention will be explained by referring to FIG. 9 to FIG. 11 and FIG. 12 to FIG. 18.

Figure 9:
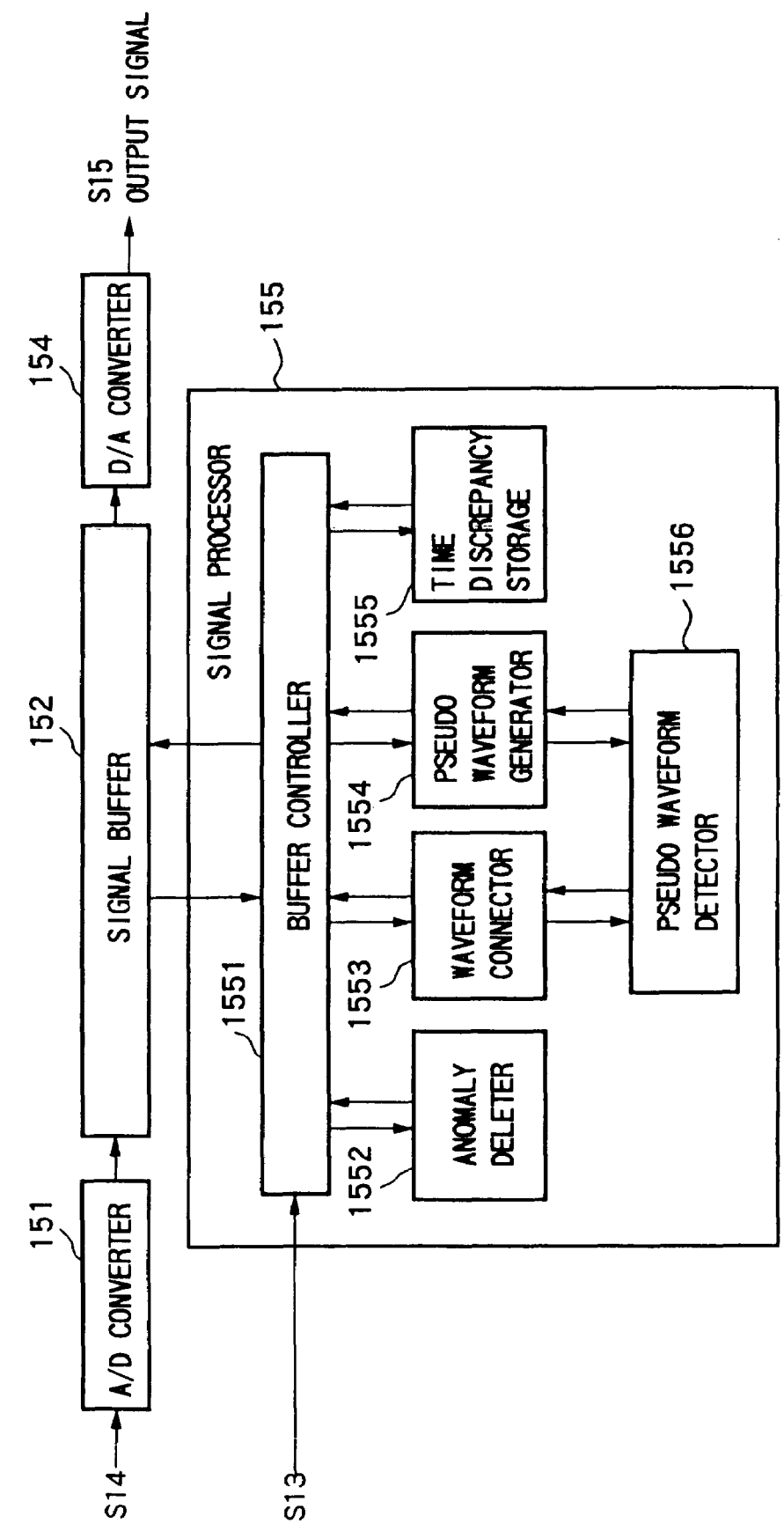
FIG. 9 is a view of the configuration of a waveform connector illustrated in FIG. 1.

FIG. 9 is a view of the configuration of the waveform connector 15.

Figure 10:
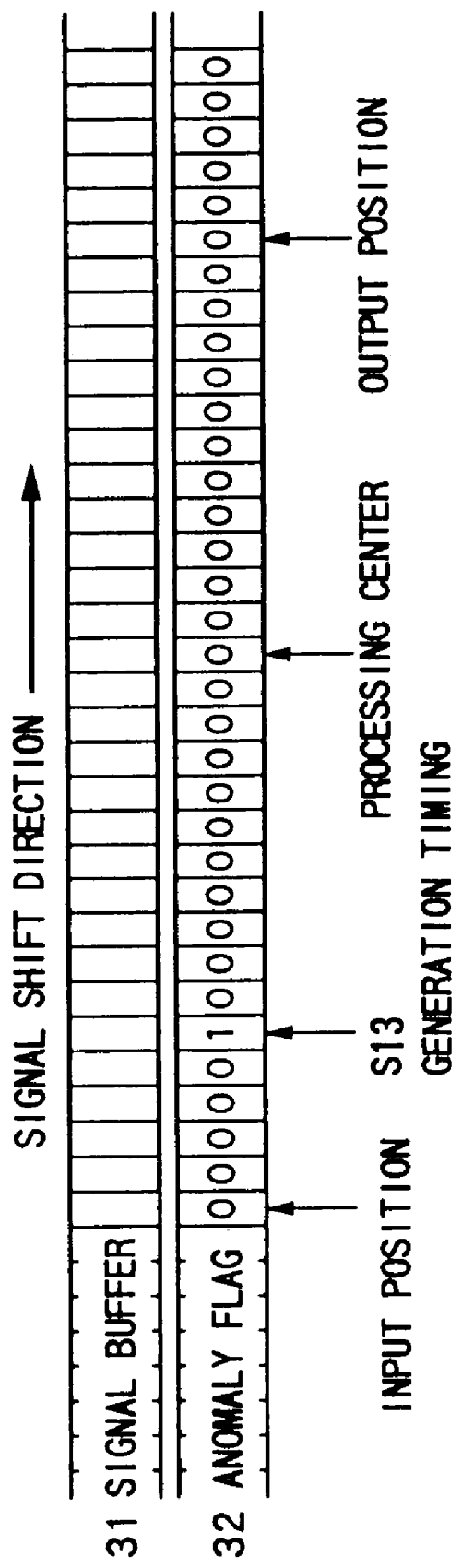
FIG. 10 is a view of the configuration of a signal buffer illustrated in FIG. 9.

FIG. 10 is a view of the processing of the signal buffer 152.

Figure 11:
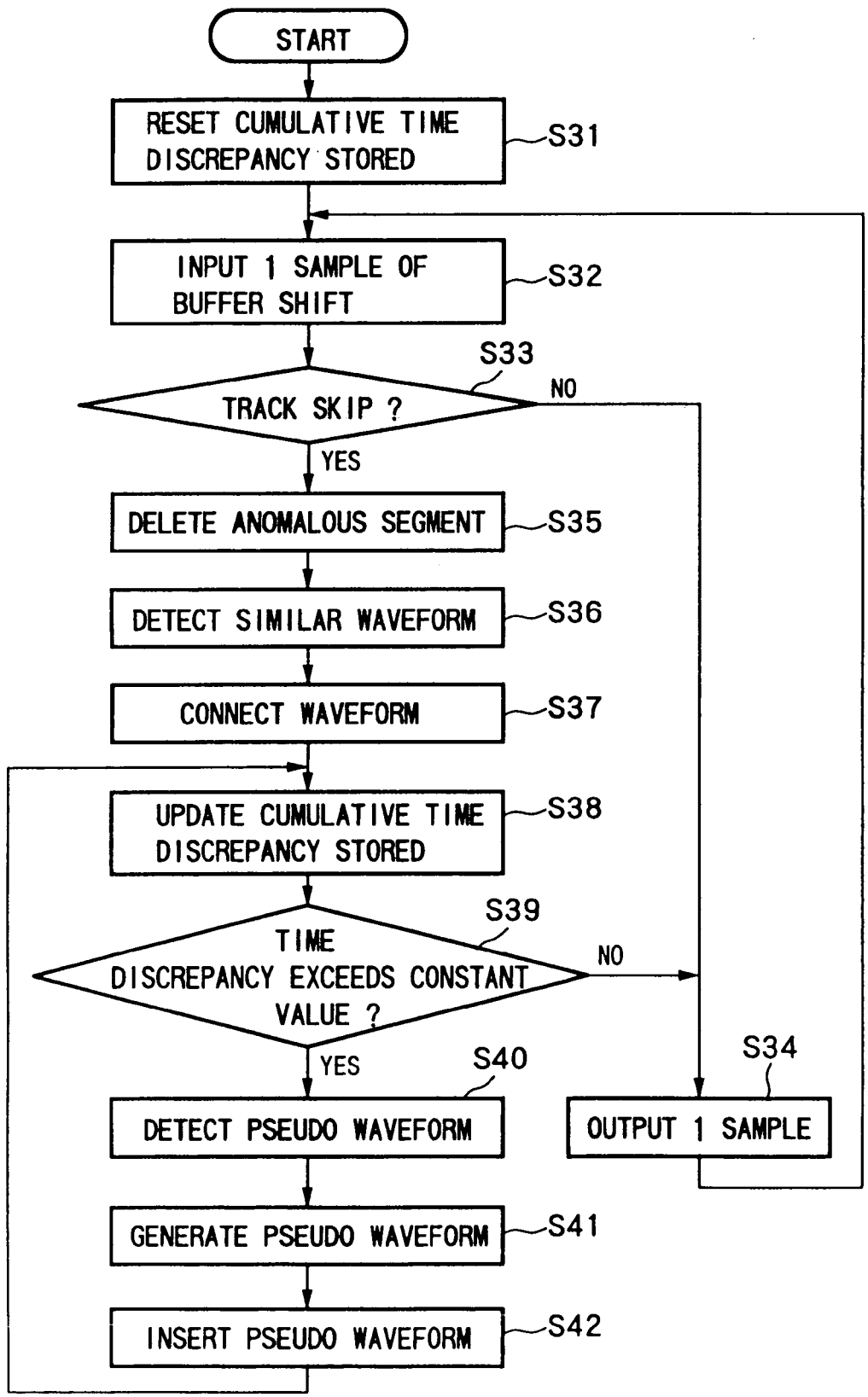
FIG. 11 is a flow chart of the operation of a signal processor in the waveform connector illustrated in FIG. 9.

FIG. 11 is a flow chart of the processing of a signal processor 155.

FIG. 12 to FIG. 18 are views of the waveforms of the signals processed at the waveform connector.

The waveform connector 15 is a waveform connector utilizing the track skip pulse S13 generated in the track skip detector 13. The track skip time becomes clear from the track skip pulse S13, so the waveform connector 15 connects the waveform by utilizing this.

The waveform connector 15 illustrated in FIG. 9 has an A/D converter 151, a signal buffer 152, a D/A converter 154, and a signal processor 155.

When the audio signal is input in a digital format, the A/D converter 151 and the D/A converter 154 are unnecessary.

Figure 12:
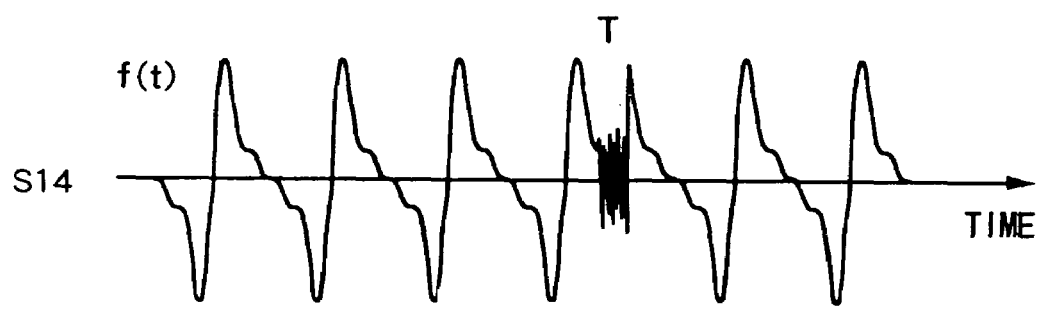
FIG. 12 is a waveform diagram of an input signal subjected to the signal processing in the waveform connector of FIG. 9.

The A/D converter 151 converts an analog audio signal S14 demodulated at the FM demodulator 14 shown in FIG. 12 to a digital audio signal.

Signal Buffer

As illustrated in FIG. 10, the signal buffer 152 comprises a for example 16-bit signal buffer and a 1-bit anomaly flag located at a position corresponding to the position of the audio signal to be stored. The content of the signal buffer 152 is shifted rightward every sampling time. New data is added to the input position and the data at the output position is output. The audio signal stored in the signal buffer 152 is stored in time series, so the storage position of the audio signal corresponds to the time. The output position and the processing center position do not vary, but the input position varies in accordance with the time discrepancy due the processing of the signal processor.

The D/A converter 154 converts the digital audio signal output from the signal buffer 152 to an analog audio signal.

Signal Processor

The signal processor 155 illustrated in FIG. 9 has a buffer controller 1551, an anomaly deleter 1552, a waveform connector 1553, a pseudo waveform generator 1554, a time discrepancy storage 1555, and a pseudo waveform detector 1556.

The signal processor 155 monitors the existence of generation of the track skip pulse S13 and performs a series of processing of anomalous segment deletion, waveform connection, and pseudo waveform insertion when an anomalous state arises in the waveform due to the generation of the track skip pulse S13.

Buffer Controller

The buffer controller 1551 concludes that there is an anomaly in the waveform of the audio signal when there is a reception of the track skip pulse S13 and sets the anomaly flag portion in the signal buffer 152 corresponding to that time at "1".

FIG. 12 is a waveform diagram of an audio signal S141 output from the A/D converter 151 to the signal processor 155. Assume that an anomalous portion exists in a period T. The period T indicates the center time of the processing of the signal buffer 152.

The buffer controller 1551 further exchanges the audio signal processed in the waveform connector 1553, pseudo waveform generator 1554, time discrepancy storage 1555, and pseudo waveform detector 1556 with the signal buffer 152 to shift and replace the data in the signal buffer 152 along with the series of processing.

Anomaly Deleter

The anomaly deleter 1552 deletes the signal of the anomalous portion.

Figure 13:
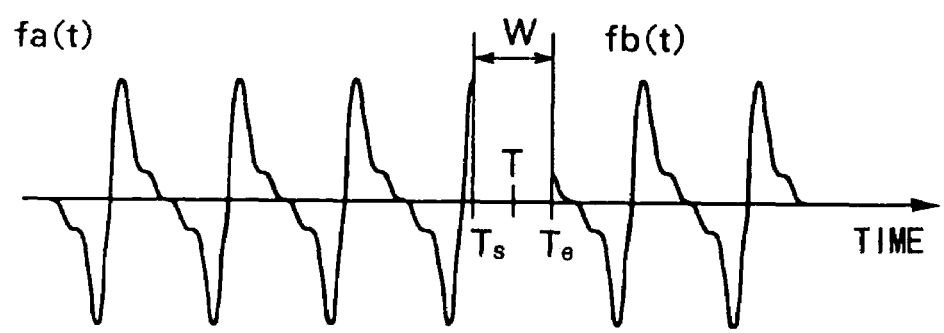
FIG. 13 is a waveform diagram of a signal with an anomalous portion deleted therefrom in the waveform connector of FIG. 9.

FIG. 13 is a signal waveform diagram of the case where the anomalous portion is deleted from the signal waveform illustrated in FIG. 12 by the anomaly deleter 1552.

W represents a deletion time width (deleted segment length), TS represents a deletion start time, and Te represents a deletion end time.

Details of the deletion time width (deleted segment length) W, deletion start time TS, and deletion end time Te will be explained later. The deleted segment length W may be set longer than the maximum time length of the shot noise. It is set at for example 20 ms in the case of shot noise, and while is set at for example 5 ms in the case of discontinuity or signal skip.

Waveform Connector

The waveform connector 1553 overlaps and connects the waveform before and after the deleted segment illustrated in FIG. 13 to give a maximum similarity. The similarity is evaluated according to a mutual correlation coefficient.

The waveform of the input audio signal is defined as f(t) and the waveform in the forward direction of the deleted segment is represented by the following equation 1.

$$f_a(t) = \begin{cases} f(t) & (t \leq T_s) \\ 0 & (t > T_s), \end{cases} \quad (1)$$

The waveform in back of the deleted segment is represented by the following equation 2.

$$f_b(t) = \begin{cases} 0 & (t < T_e) \\ f(t) & (t \geq T_e), \end{cases} \quad (2)$$

Figure 14:
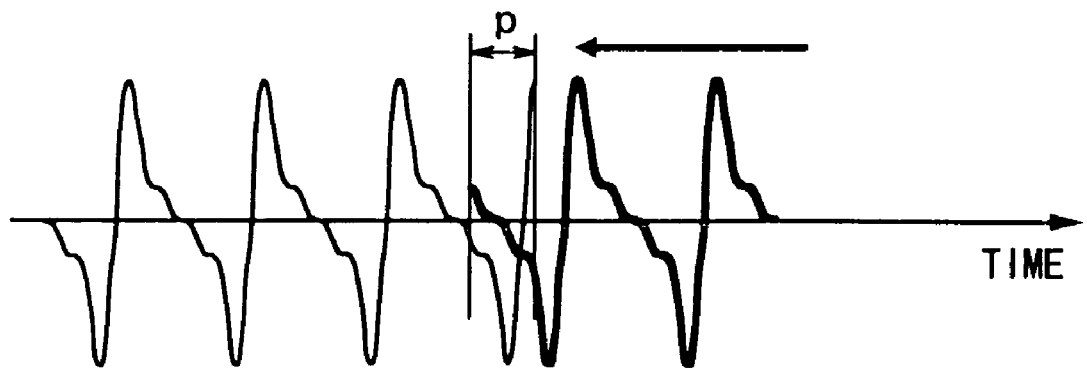
FIG. 14 is a signal waveform diagram for explaining a method of detecting similar waveforms in the waveform connector of FIG. 9.

As illustrated in FIG. 14, when superposed on each other by exactly a length p, the mutual correlation coefficient of the superposed portions becomes as shown in the following equation 3.

$$R(p) = \frac{\int_0^p f_a(t + T_s - p) f_b(t + T_e) \, dt}{\sqrt{\int_0^p f_a^2(t + T_s - p) \, dt \int_0^p f_b^2(t + T_e) \, dt}} \quad (3)$$

This processing corresponds to calculation of the correlation by shifting the waveform in back of the deleted segment forward by exactly a length (p+W). That is calculated within a range of $P_{min} \leq P \leq P_{max}$. The time difference p giving the maximum correlation coefficient is determined as an overlap segment length P.

$$P=\{p|R(p)\to\text{maximum}, P_{min}\leq P\leq P_{max}\} \quad (4)$$

Here, the search range of P is made about the same degree as one pitch period of the speech or music (audio signal). For example, $p_{min}$=4 ms and $p_{max}$=20 ms are set.

Figure 15:
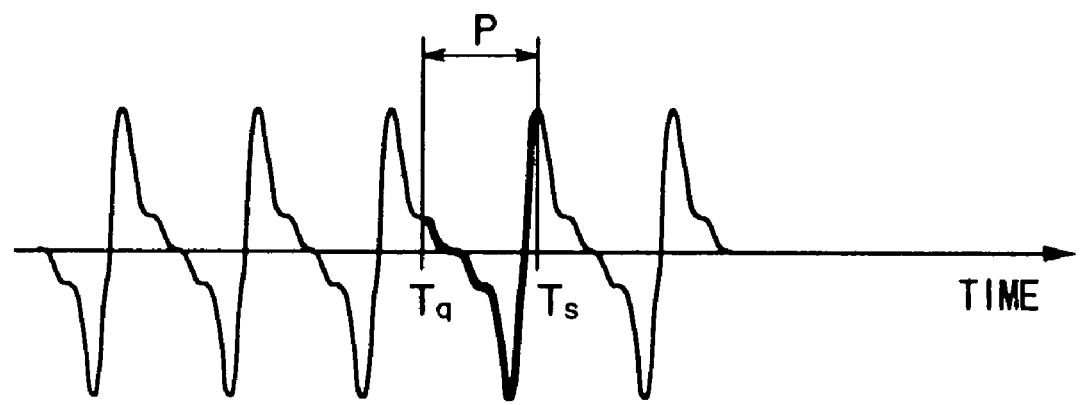
FIG. 15 is a signal waveform diagram for explaining a method of connecting the waveform in the waveform connector of FIG. 9.

After the overlap segment length is determined, as shown in FIG. 15, the front and back waveform are superposed over the segment P and cross faded.

$$g(t) = \begin{cases} f_a(t) & (t \leq T_q) \\ \{(T_s - t)f_a(t) + (t - T_q)f_b(t+W)\}/P & (T_q < t < T_s) \\ f_b(t+W) & (t \geq T_s) \end{cases} \quad (5)$$

Note that, Tq=Ts−P.

Due to this method, the followings are realized:

1. Sound having periodicity in the waveform like speech (vowels) or music usually has the maximum correlation in that period or a whole multiple of the same, so can be connected while maintaining the periodicity.

2. Even if not a periodic waveform, it can be connected by the portion having the highest correlation, that is, similar in waveform.

3. Due to the cross fading, it can be smoothly connected without discontinuity in the waveform.

Time Discrepancy Storage and Pseudo Waveform Generator

According to the above processing, the waveform is shortened by (W+P) time for each anomaly. Therefore, if left as it is, the discrepancy between the original sound and the processed sound will accumulate. Therefore, the cumulative time discrepancy from the point of time of start of the processing is stored in the time discrepancy storage 1555. When the waveform is shortened by a constant value or more, a short pseudo waveform is prepared in the pseudo waveform generator 1554 and inserted to thereby stretch the total length.

As shown at step 31 of FIG. 11, first, at the start of the processing, the time discrepancy storage 1555 resets the cumulative time discrepancy stored. The time discrepancy storage 1555 subtracts (X+P) from the cumulative time discrepancy stored at step 38 whenever the anomaly processing is carried out at steps 33 to 37. When the time discrepancy storage 1555 detects that the cumulative time discrepancy exceeds a set value during the processing (step 39), the pseudo waveform detector 1556, the pseudo waveform generator 1554, and the waveform connector 1553 perform the pseudo waveform detection processing, pseudo waveform generation processing, and the pseudo waveform insertion processing shown at steps 40 to 42. This set value may be for example 0 second. In that case, the waveform is always stretched in the initial processing and the signal is adjusted to maintain a slightly longer time than the original sound.

Figure 16:
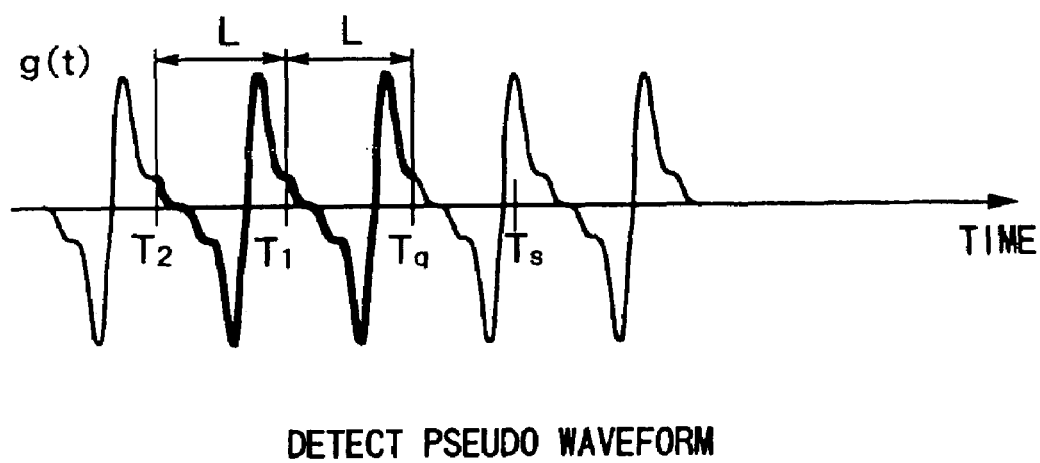
FIG. 16 is a signal waveform diagram for explaining a second method of detecting similar waveforms in the waveform connector of FIG. 9.

The pseudo waveform generation and insertion processing will be explained below. An example of the waveform after the waveform connection processing is shown in FIG. 16.

First, a waveform having a length l is taken in the front of the frontmost portion Tq of the connection point, and the mutual correlation coefficient with the waveform further in front from that by a length l is calculated.

$$R(1) = \frac{\int_0^1 g(t+T_q-1)g(t+T_q-21)dt}{\sqrt{\int_0^1 g^2(t+T_q-1)dt \int_0^1 g^2(t+T_q-21)dt}} \quad (6)$$

This is calculated over a segment of $l_{min} \leq l \leq l_{max}$. The l which becomes the maximum is determined as the pseudo waveform time length L.

$$L=\{l|R(l)\to\text{maximum}, l_{min}\leq l\leq l_{max}\} \quad (7)$$

Here, the search range of the length l is made about the same degree as one pitch period of speech or music in the same way as the waveform connection portion. For example, $l_{min}$ is made 4 ms and $l_{max}$ is made 20 ms.

Figure 17:
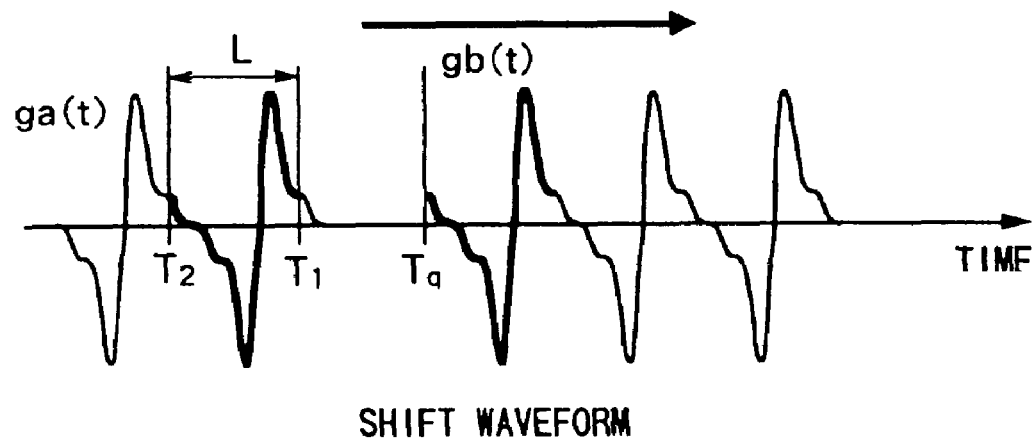
FIG. 17 is a signal waveform diagram for explaining a method of shifting waveform signals for connecting the waveform in the waveform connector of FIG. 9.

After the pseudo waveform time length L is determined, as shown in FIG. 17, the waveform is divided at the time Tl=Tq−L. The back waveform is moved back by exactly L. When the front waveform is ga (t) and the back waveform after the movement is ga(t), they can be represented as follows by using g(t) of equation 5.

$$g_a(t) = \begin{cases} g(t) & (t \leq T_1), \\ 0 & (t > T_1), \end{cases} \quad (8)$$

$$g_b(t) = \begin{cases} 0 & (t \leq T_q), \\ g(t-W) & (t > T_q), \end{cases} \quad (9)$$

Figure 18:
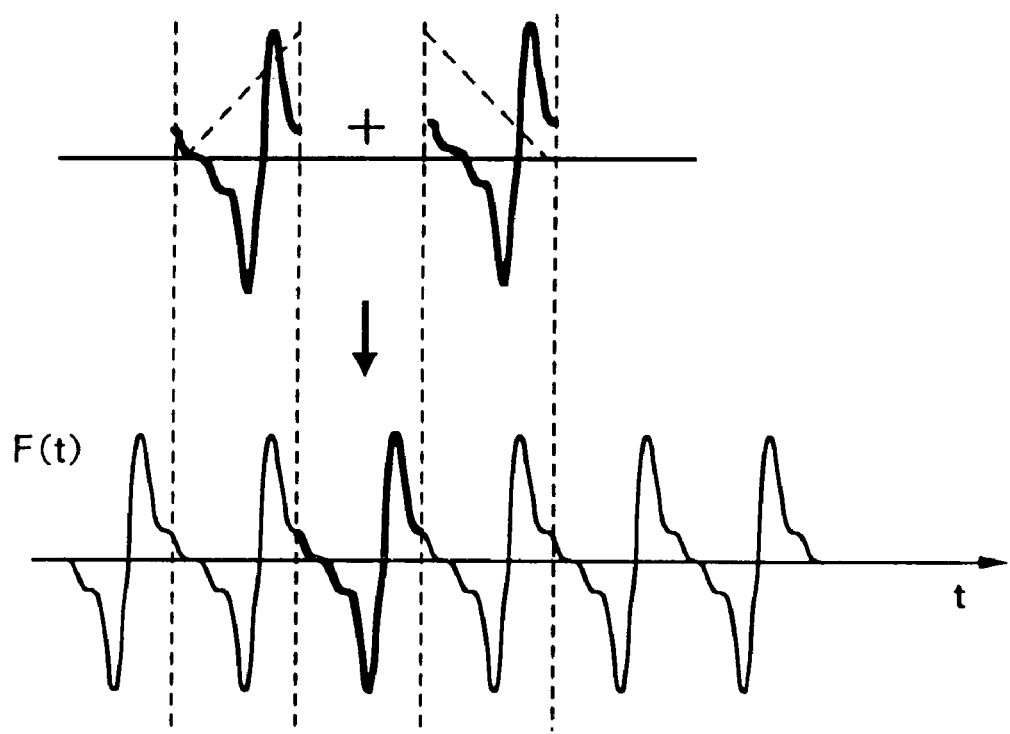
FIG. 18 is a signal waveform diagram for explaining a method of preparing a similar waveform for connecting the waveform in the waveform connector of FIG. 9 and inserting the same.

Finally, as shown in FIG. 18, a pseudo waveform prepared by cross fading the waveform on the two sides shown in equation 10 is inserted in the segment Tl<t<Tq which becomes empty by the above processing, $$F(t) = \begin{cases} g_a(t) & (t \leq T_1), \\ \{(T_q - t)g_a(t) + (t - T_1)g_b(t)\}/L & (T_1 < t < t_q), \\ g_b(t) & (t \geq T_q), \end{cases} \quad (10)$$

The following can be realized by such a method.

1. Sound having periodicity in waveform like speech (vowels) or music has the maximum correlation in a whole multiple of the period, so the waveform is stretched while maintaining the periodicity.

2. Even if not a periodic waveform, it can be connected by the portion having the highest correlation, that is, similar in waveform.

3. Due to the cross fading, it can be smoothly connected without discontinuity in the waveform.

Time Discrepancy Storage

The time discrepancy storage 1555 stores the shortened time from the start of the processing and the cumulative time of the extension.

The series of operation of the waveform connector 15 will be explained next by referring to FIG. 11.

Step 31: Before storing the audio signal in the signal buffer 152, as the initial operation, the buffer controller 1551 in the signal processor 155 resets the cumulative time discrepancy storage data.

Step 32: The analog audio signal S14 illustrated in FIG. 12 demodulated in the FM demodulator 14 is converted to a digital audio signal in the A/D converter 151. The converted digital audio signal S151 is successively stored in the signal buffer 152 every sample time. The signal buffer 152 is configured by a ring buffer or FIFO. The digital data is given from its output end to the D/A converter 154 every sample time and output as an output audio signal S15.

Step 33: The buffer controller 1551 decides that an anomalous state occurred when receiving a track skip pulse S13, sets the anomaly flag at the position corresponding to that time in the signal buffer 152 (FIG. 10), and proceeds to the processing of step 35 and the following steps. When it does not receive the track skip pulse S13, the operation routine shifts to the processing of step 34.

Step 34: When there is no anomaly, the buffer controller 1551 does nothing. In that case, the audio signal successively stored in the signal buffer 152 is successively output to the D/A converter 154 after a predetermined time.

Step 35: When an anomalous state is detected at the buffer controller 1551, the anomaly deleter 1552 deletes the data of the anomalous portion in the vicinity of the time T in FIG. 12 described above. Namely, when the anomalous state is detected, the anomaly deleter 1552 deletes the signal before and after the processing center time as illustrated in FIG. 13. The noise, data loss, or the like to be eliminated by the present invention is instantaneous shot noise or discontinuity, so the deleted segment may be made for example about 5 ms.

Steps 36 to 37: When the anomalous data is deleted, the waveform connector 1553 connects the signal before and after the deleted segment in cooperation with the pseudo waveform detector 1556 and the pseudo waveform generator 1554.

The pseudo waveform detector 1556 searches for a similar portion by shifting the waveform data in back of the deletion portion as illustrated in FIG. 14 and overlaps and adds it so that the parts of the waveform before and after the deleted portion resemble each other the most.

The pseudo waveform generator 1554 detects the similar waveform of the data stored in the signal buffer 152 by utilizing the pseudo waveform detector 1556 again in order to compensate for the portion shortened in the total length of the data by the processing of the anomaly deleter 1552 and the waveform connector 1553, generates the pseudo waveform for stretching the waveform, and inserts the generated waveform data into the portion deleted by the anomaly deleter 1552.

Step 38: The time discrepancy storage 1555 adds and stores the time length of the shortening/extension of the waveform by the anomaly deleter 1552, waveform connector 1553, and the pseudo waveform generator 1554.

Step 39: The time discrepancy storage 1555 decides whether or not the time discrepancy is within a constant value. When it is within the constant value, the operation routine shifts to the processing of step 34.

Steps 40 to 42: When the time discrepancy exceeds the constant value, the above processing is repeated. Namely, the similar waveform detector 1556 evaluates the similarity of the waveform at a different time in the signal buffer 152 as explained above.

Since the time discrepancy storage 1555 manages the amount of data of the audio signal in the deleted segment as time, so disconnection or overlap of the audio signal is eliminated.

The above waveform connector 15 is able to delete the noise segment for shot noise superposed on the signal, signal skip, discontinuity, etc., smoothly connect the waveform before and after the deletion, and limit the time discrepancy from the original signal to the smallest level by inserting a pseudo waveform into the signal. Namely, the waveform connector 15 of the present embodiment can delete noise derived from shot noise or discontinuity of the audio signal without distorting the normal portion, smoothly interpolate the discontinuous portion, and reduce incongruity in sound.

Further, the Hi-Fi video apparatus 1 of the embodiment of the present invention illustrated in FIG. 1 generates an audio signal compensated for discontinuity even in the case where there is a discontinuity of the audio signal due to a track skip at the time of high speed reproduction or switching of the rotary head sat the head switch 12 and as a result can reproduce an audio signal without concern as to discontinuity.

Second Example of Hi-Fi Video Apparatus

A second example of the Hi-Fi video apparatus of the present invention will be explained by referring to FIG. 19 to FIG. 20.

The Hi-Fi video apparatus 1A of the second example has a rotary head controller 11, head switch 12, track skip detector 13, FM demodulator 14, waveform connector 15A, a rotary head drum 16 illustrated in FIG. 2, a fixed head 17 illustrated in FIG. 2, a not illustrated rotation drive controller of the rotary head drum 16, a not illustrated running drive controller of the magnetic tape 18, a not illustrated audio signal reproducing apparatus, and a not illustrated video signal reproducing apparatus.

Figure 19:
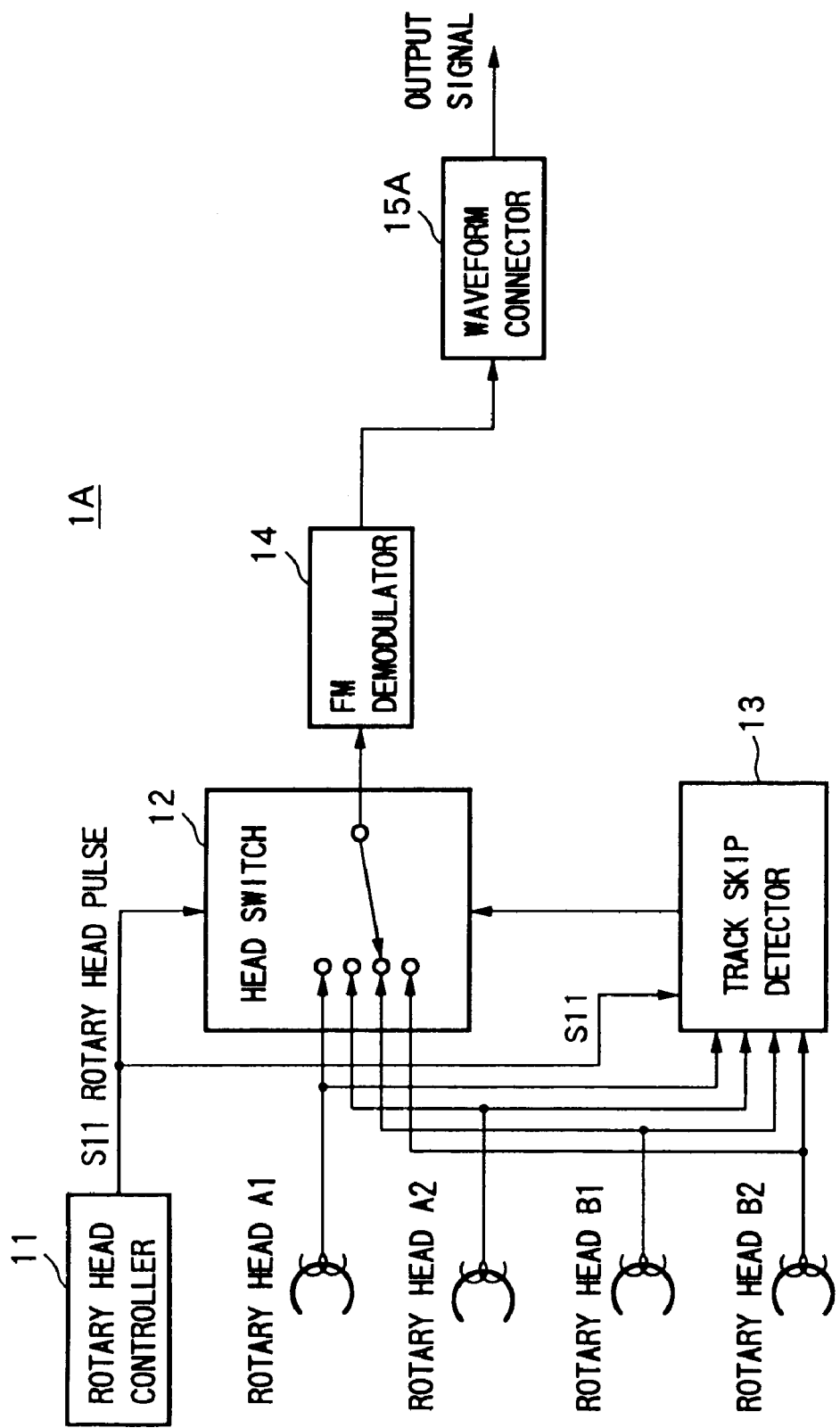
FIG. 19 is a schematic view of the configuration of a second example of a Hi-Fi video apparatus according to an embodiment of the present invention.
Figure 20:
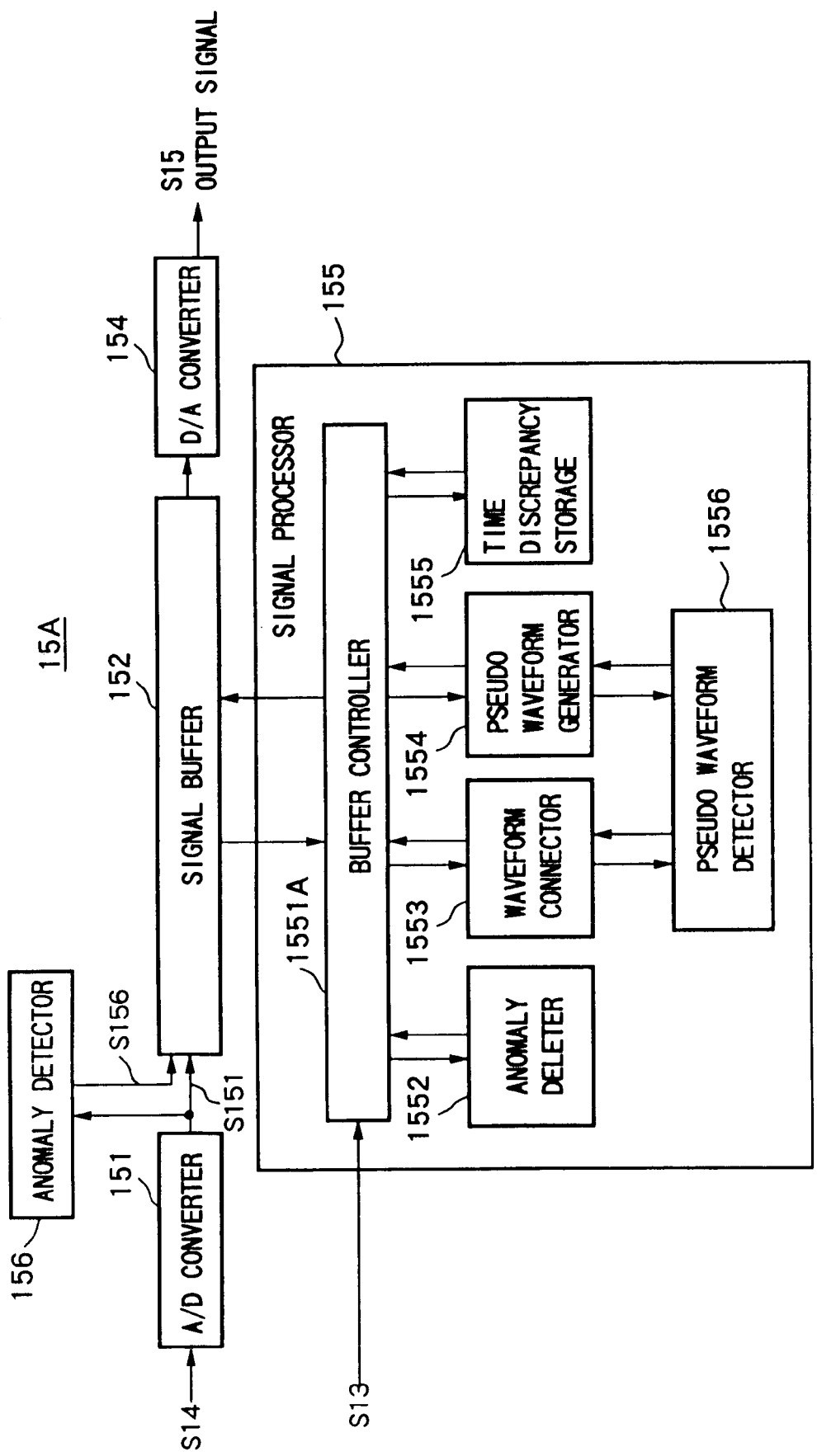
FIG. 20 is a view of the configuration of the waveform connector in FIG. 19.

The Hi-Fi video apparatus 1A illustrated in FIG. 19 has a similar configuration to that of the Hi-Fi video apparatus 1 illustrated in FIG. 1, but the track skip pulse S13 is not output from the track skip detector 13 to the waveform connector 15An and the configuration of the waveform connector 15A is different from that of FIG. 9 as illustrated in FIG. 20. The other portions are similar to those of the Hi-Fi video apparatus 1 of FIG. 1, however. Accordingly, the following description will be made focusing on portions different from the first example.

Waveform Connector

The waveform connector 15A will be explained by referring to FIG. 20.

The waveform connector 15A has an A/D converter 151, signal buffer 152, D/A converter 154, signal processor 155A, and anomaly detector 156. When the audio signal is input in a digital form, the A/D converter 151 and the D/A converter 154 are unnecessary.

The waveform connector 15A does not use a track skip pulse S13 generated in the track skip detector 13 unlike the waveform connector 15 of FIG. 9. For this reason, the anomaly detector 156 is provided in the waveform connector 15A, and the processing of the signal processor 155A is slightly different from the processing of the signal processor 155 illustrated in FIG. 9.

Anomaly Detector

Figure 21:
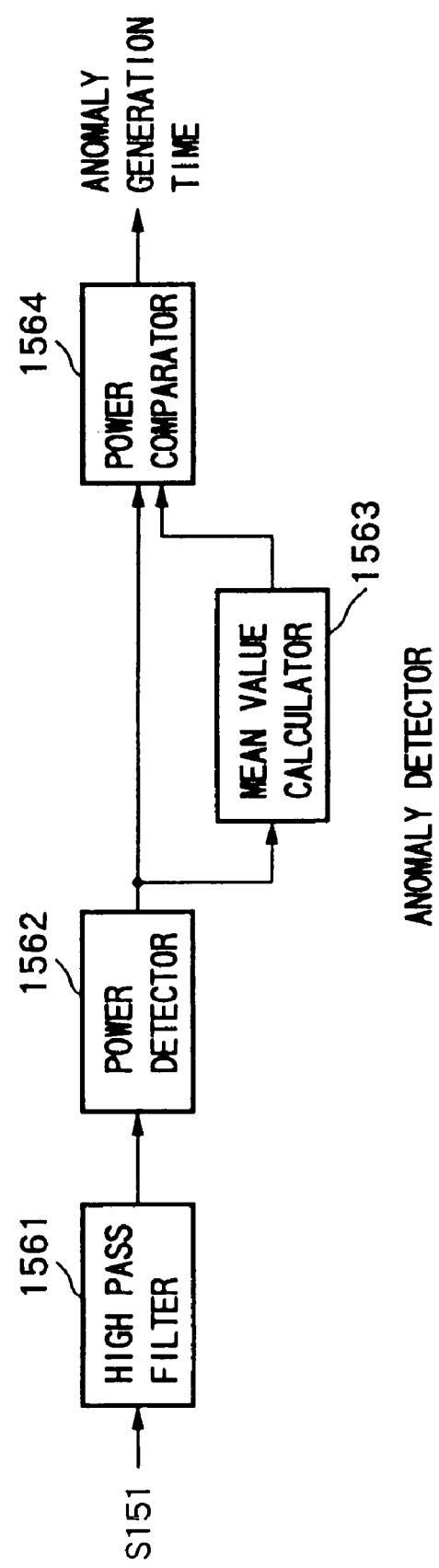
FIG. 21 is a view of the configuration of an anomaly detector in FIG. 20.

FIG. 21 is a view of the configuration of the anomaly detector 156.

The anomaly detector 156 has a high pass filter 1561, a power detector 1562, a mean value calculator 1563, and a power comparator 1564.

The anomaly to be eliminated by the present invention is short time shot noise or signal loss, short time signal skip (so-called sound skip), or discontinuity due to track skip, the switching of the rotary heads, etc. At the time of detection of an anomaly, the fact that a high frequency component is instantaneously largely generated due to the nature of the shot noise or skip is utilized. For example, in speech or music, the component up to about 10 kHz at most is dominant, but in contrast, in shot noise, a component up to near the Nyquist frequency is instantaneously generated.

The high pass filter 1561 passes the high frequency component of an audio signal S151 output from the A/D converter 151 therethrough. The power detector 1562 calculates the power of the signal passed through the high pass filter 1561, that is, the square of the signal passed through the high pass filter 1561. The mean value calculator 1563 calculates the mean value of the power over for example past 50 ms of the audio signal of the high frequency component. The power comparator 1564 compares the mean value of the power calculated at the mean value calculator 1563 and the power of the audio signal calculated at the power detector 1562. When the power value is larger than the mean power value, the time is detected as the time of generation of instantaneous noise or a skip.

FIG. 12 illustrates an example of a waveform having an anomalous portion due to the disturbance of the waveform on the periphery of the time T. When the audio signal behaves as in the period T of FIG. 12, the value deviates from the mean value of the audio signal, so the anomalous state can be detected at the power comparator 1564.

The anomalous state detected at the anomaly detector 156 is notified to the signal buffer 152 illustrated in FIG. 10. The signal buffer 152 sets the anomaly flag in the corresponding data.

The signal buffer 152 is similar to the signal buffer 152 explained above. Namely, as illustrated in FIG. 10, it comprises for example a 16-bit signal buffer and a 1-bit anomaly flag. The content of the signal buffer 152 is shifted rightward every sample time. New data is added to the input position and the data at the output position is output. The output position and the processing center position do not vary, but the input position varies in accordance with the time discrepancy due the processing of the signal processor.

In the present example, the anomaly flag is set in accordance with not the track skip pulse S13, but the detection of the anomaly detector 156.

Signal Processor

The signal processor 155A illustrated in FIG. 20 has a buffer controller 1551A, anomaly deleter 1552, waveform connector 1553, pseudo waveform generator 1554, time discrepancy storage 1555, and pseudo waveform detector 1556.

The signal processor 155 monitors the anomaly flag stored in the signal buffer 152 by the anomaly detector 156, performs no operation where the anomaly flag is "0" (where there is no anomaly), and performs a series of processing of anomalous segment deletion, waveform connection, and pseudo waveform insertion where the anomaly flag is "1" (where there is an anomaly).

Figure 22:
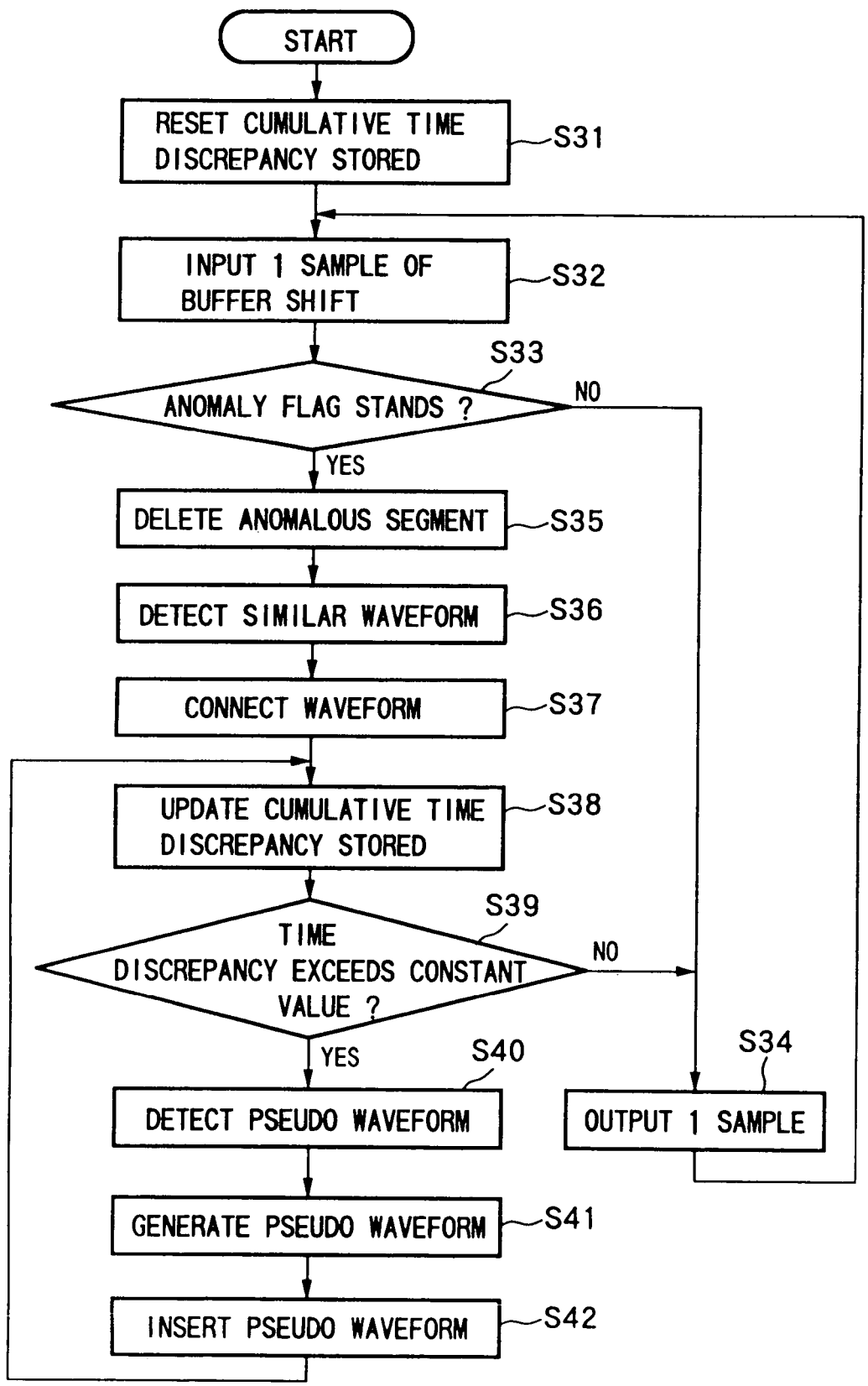
FIG. 22 is a flow chart of the operation of a signal processor in the waveform connector illustrated in FIG. 19.

FIG. 22 is a flow chart of the processing of the signal processor 155A.

Buffer Controller

The buffer controller 1551A monitors the anomaly flag at the processing center for the data stored in the signal buffer 152 illustrated in FIG. 10. Namely, the track skip pulse S13 is not input to the buffer controller 1551A, so the set state of the anomaly flag set by the anomaly detector 156 is achieved by the buffer controller 1551A. Accordingly, the decision of the anomaly by the buffer controller 1551A of step 33A in FIG. 22 becomes the monitoring of the set state of the anomaly flag of the signal buffer 152.

The buffer controller 1551A further shifts and replaces the data in the buffer along with the series of processing for the signal with the waveform shown in FIG. 12 to FIG. 18.

Anomaly Deleter, Waveform Connector, Pseudo Waveform Generator, Time Discrepancy Storage The anomaly deleter 1552, waveform connector 1553, pseudo waveform generator 1554, and time discrepancy storage 1555 perform similar processing to that explained above by referring to FIG. 9.

As explained above, the waveform connector 15 of FIG. 9 and the waveform connector 15A of FIG. 20 are different in only the method of detection of the anomalous state. Accordingly, the waveform connector 15A of FIG. 20 can perform similar waveform connection processing to that of the waveform connector 15 of FIG. 9.

As a result, the Hi-Fi video apparatus 1A illustrated in FIG. 19, similar to the Hi-Fi video apparatus 1 of FIG. 1, can perform signal processing to eliminate anomalous due to track skip, switching of the rotary heads, or the like. Namely, the Hi-Fi video apparatus 1A using the waveform connector 15A illustrated in FIG. 19 generates an audio signal compensated for anomaly even when there is an anomaly of the audio signal due to track skip at the time of high speed reproduction and the switching of the rotary heads in the head switch 12 and as a result can reproduce an audio signal without concern as to anomaly.

Third Example of Hi-Fi Video Apparatus

The method of detection of the anomalous portion in the waveform connectors 15 and 15A is not limited to the examples explained above. Other various methods can be employed.

For example, in the same way as a track skip being detected at the track skip detector 13 and a track skip pulse S13 being output to the waveform connector 15, a signal indicating an anomalous state in the apparatus using the waveform connector 15 from that apparatus and an auxiliary signal can be input to for example the buffer controller 1551 of the signal processor 155 illustrated in FIG. 9.

As such an auxiliary signal, use can be made of for example an error correction code used at the time of reproduction of a CD etc. By this, the time of generation of the anomaly becomes clear, and the processing in the waveform connector 15 becomes possible.

The waveform connectors 15 and 15A can be applied to not only a Hi-Fi video apparatus, but also various other apparatuses handling audio signals. As such apparatuses, there are for example CD audio signal players, MD players, DVD players, cellular phones, 8 mm video apparatuses, and audio signal communication devices.

When the present invention is applied to such apparatuses, even if there is noise or skips due to scratches or dust on the magnetic tape, noise or skips due to scratches or dust on the magnetic disk, noise or skips due to scratches or dust on the optical disk, noise or skips due to scratches or dust on the analog record disk, noise or signal loss occurring in the air or apparatus, etc., the influence of them can be eliminated and the incongruity in sound can be reduced.

Further, the present invention is not limited to the Hi-Fi video apparatuses explained above and can be applied to the signal processing of an anomaly caused when reproducing an audio signal recorded on a magnetic tape or a rotary recording medium such as a magnetic disk.

Digital Video Signal Recording and/or Reproducing Apparatus

As another embodiment of the present invention, a digital video signal recording and/or reproducing apparatus will be explained. The explanation of the processing in the Hi-Fi video apparatuses also applies to a digital video signal recording and/or reproducing apparatus, but a Hi-Fi video apparatus and digital video signal recording and/or reproducing apparatus have the following differences.

1. A digital video signal recording and/or reproducing apparatus is controlled to follow a track by a dynamic tracking head even at the time of high speed reproduction, so skips occur also in units of tracks.

2. A digital video signal recording and/or reproducing apparatus can easily judge a track skip since an ID is recorded at the track head.

Figure 23:
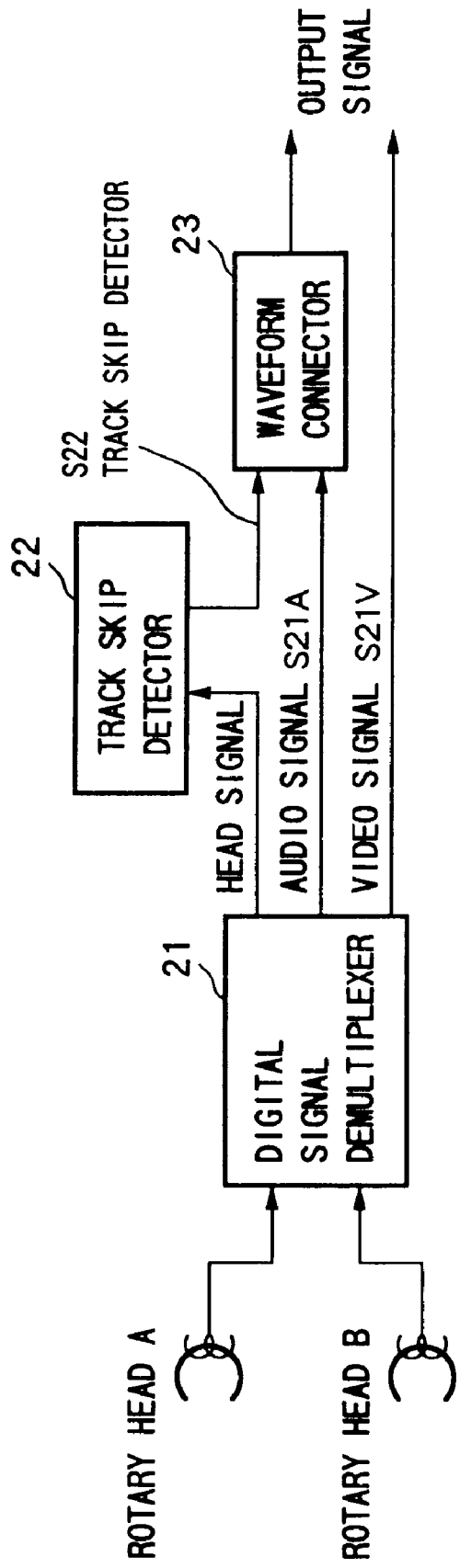
FIG. 23 is a view of the configuration of a digital video signal recording and/or reproducing apparatus according to a second embodiment of the present invention.

FIG. 23 is a view of the configuration of a digital video signal recording and/or reproducing apparatus 2 taking into account the above conditions.

The digital video signal recording and/or reproducing apparatus 2 has a not illustrated rotary drum with rotary heads An and B mounted thereon, a digital signal demultiplexer 21, a track skip detector 22, and a waveform connector 23.

Figure 24:
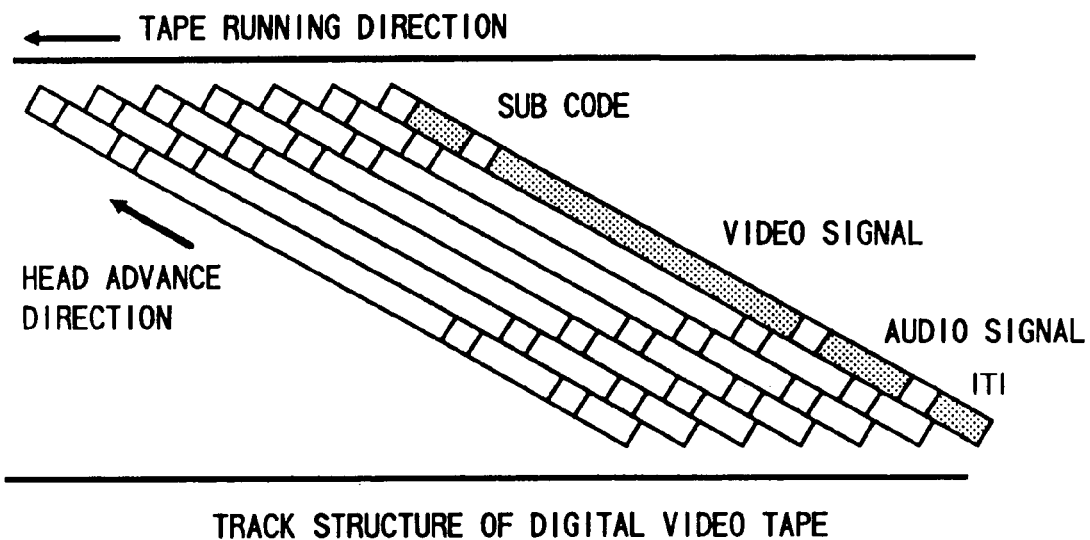
FIG. 24 is a view of a track structure of a recording surface of a consumer use digital video tape in FIG. 23.
Figure 25:
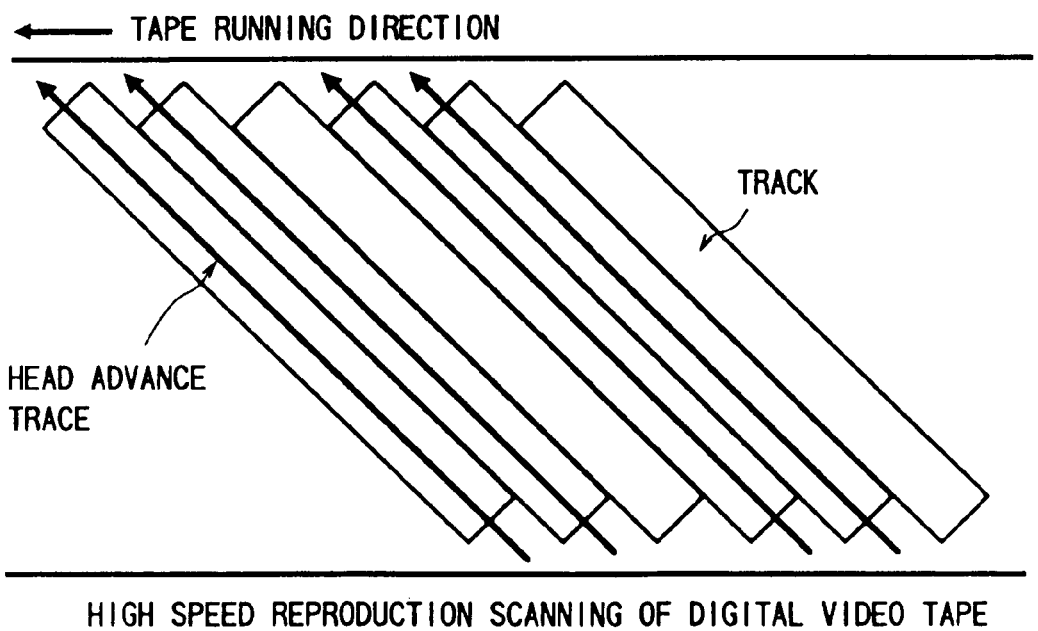
FIG. 25 is a view of a head scanning trace at the time of high speed reproduction of the digital video signal recording and/or reproducing apparatus of FIG. 23.

FIG. 24 is a view of the track structure of the recording surface of a consumer-use digital video tape, and FIG. 25 is a view of the head scanning trace at the time of high speed reproduction.

In this example, the tracks are read skipping one out of three tracks.

The rotary heads An and B are arranged facing each other at 180 degrees in the same way as illustrated in FIG. 2, but the digital video signal recording and/or reproducing apparatus is controlled to scan along a track by a not illustrated auto tracking control mechanism.

The digital signal demultiplexer 21 reads a recording signal comprised by insert and track information (ITI), an audio signal, a video signal, and a sub code and demultiplexes the same as the digital data.

The digital signal demultiplexer 21 transmits the video signal to a not illustrated usual video processor and transmits the audio signal to the waveform connector 23.

The digital signal demultiplexer 21 inputs the head signal to the track skip detector 22.

The track skip detector 22 detects the ID number of the track from the head signal, compares the same with the ID number of the track reproduced immediately before that, and determines the existence of a track skip. The track skip detector 22 sets "0" when the ID numbers continue, while sets "1" when they do not continue, and transmits a track skip pulse S22 to the waveform connector 23.

Figure 26:
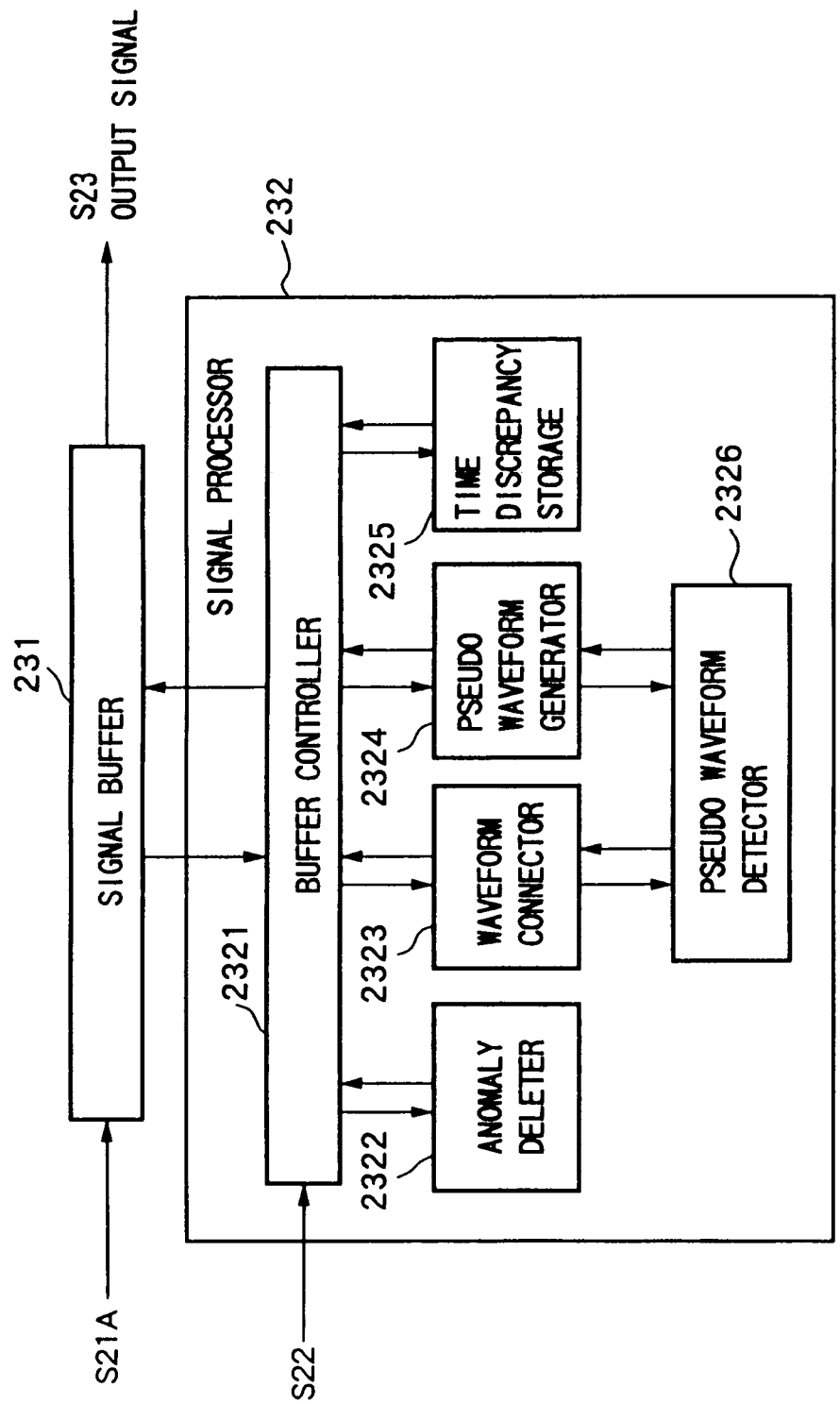
FIG. 26 is a view of the configuration of the waveform connector illustrated in FIG. 23.

The waveform connector 23 has a similar configuration to that of the waveform connector 15 illustrated in FIG. 9 as illustrated in FIG. 26.

The waveform connector 23 is configured by a signal buffer 231 and a signal processor 232. The signal processor 232 is configured by a buffer controller 2321, an anomaly deleter 2322, a waveform connector 2323, a pseudo waveform generator 2324, a time discrepancy storage 2325, and a pseudo waveform detector 2326.

The signal buffer 231 of the waveform connector 23 corresponds to the signal buffer 152 of the waveform connector 15. The signal processor 232 of the waveform connector 23 corresponds to the signal processor 155 of the waveform connector 15. The buffer controller 2321, anomaly deleter 2322, waveform connector 2323, pseudo waveform generator 2324, time discrepancy storage 2325, and pseudo waveform detector 2326 correspond to the buffer controller 1551, anomaly deleter 1552, waveform connector 1553, pseudo waveform generator 1554, time discrepancy storage 1555, and pseudo waveform detector 1556.

Note that the digital video signal recording and/or reproducing apparatus 2 performs digital signal processing, so the A/D converter 151 and the D/A converter 154 are not provided.

The signal buffer 231 receives as input a digital audio signal S21A detected and demultiplexed at the digital signal demultiplexer 21.

The buffer controller 2321 performs processing equivalent to the decision processing at step 33 of FIG. 11 when the track skip pulse S22 is "1".

The buffer controller 2321, anomaly deleter 2322, waveform connector 2323, pseudo waveform generator 2324, time discrepancy storage 2325, and pseudo waveform detector 2326 perform similar processing to that of the buffer controller 1551, anomaly deleter 1552, waveform connector 1553, pseudo waveform generator 1554, time discrepancy storage 1555, and pseudo waveform detector 1556 explained above.

As explained above, the digital video signal recording and/or reproducing apparatus 2 can repair an audio signal having an anomaly due to a track skip or the like even in the case of high speed reproduction in the same way as a Hi-Fi video apparatus.

8 mm Video Apparatus

The present invention can also be easily applied to an 8 mm video apparatus.

Figure 27:
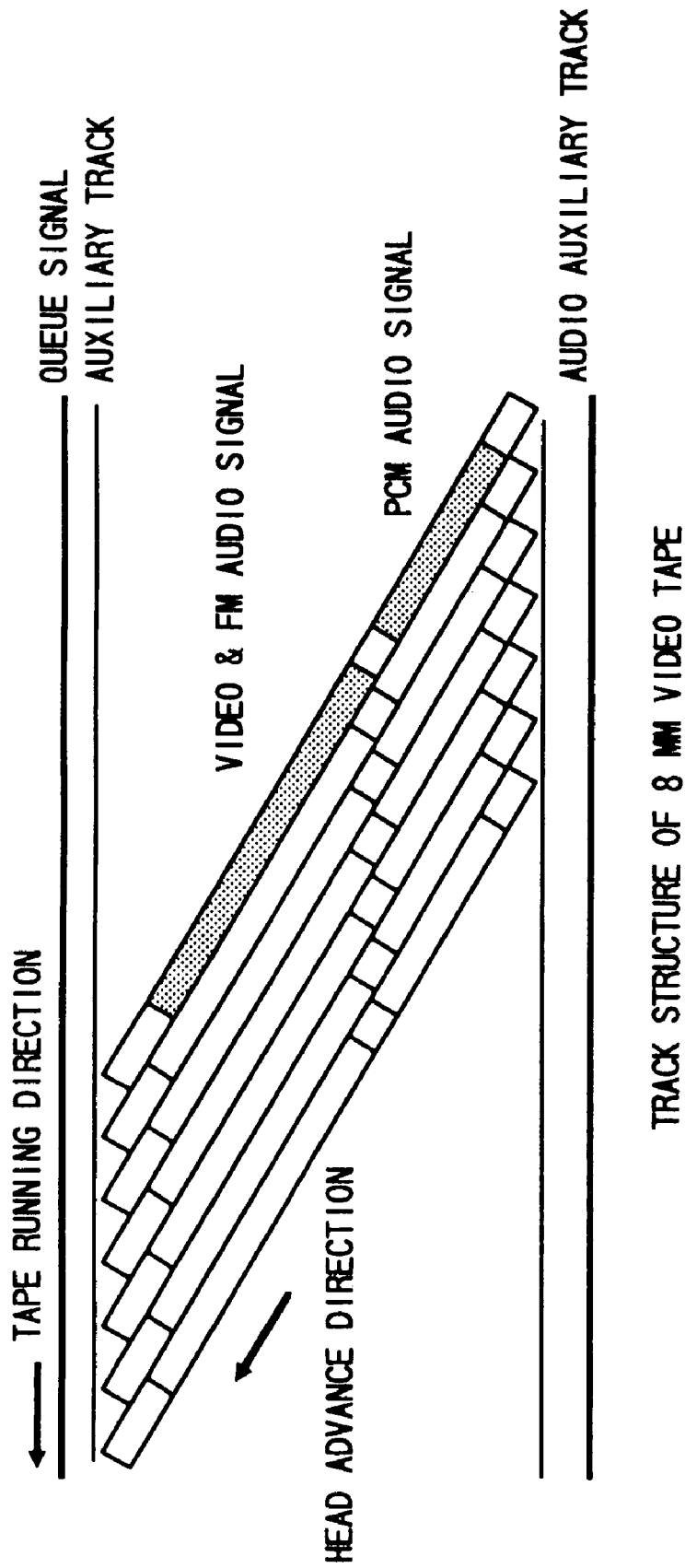
FIG. 27 is a view of the track structure of an 8 mm video tape according to a third embodiment of the present invention.

The track structure of an 8 mm video tape is shown in FIG. 27.

An audio signal is digitally recorded on the magnetic tape by a rotary head as a PCM audio signal. An FM modulated analog signal (in the same way as a Hi-Fi signal) is recorded multiplexed on the video signal.

When the 8 mm video apparatus uses an FM audio signal using a dynamic tracking head, the processing is the same as in a Hi-Fi video apparatus. Further, when the 8 mm video apparatus uses a PCM audio track using the dynamic tracking head, a similar configuration to that of the case of the digital video apparatus is employed.

In this way, the 8 mm video apparatus can utilize the audio signal of a PCM or FM track at the time of high speed reproduction.

Magnetic Disk Apparatus

The data skip in the case of a magnetic disk apparatus has the following characteristic features unlike a track skip in a Hi-Fi video apparatus or a digital video signal recording and/or reproducing apparatus explained above.

1. The random accessibility of the data is high, so a skip due to limitations of physical arrangement of the tracks on a tape does not occur.

2. Rather, at the time of high speed reproduction, there are data segments which are intentionally not read so as to keep the data within the readable speed.

Figure 28:
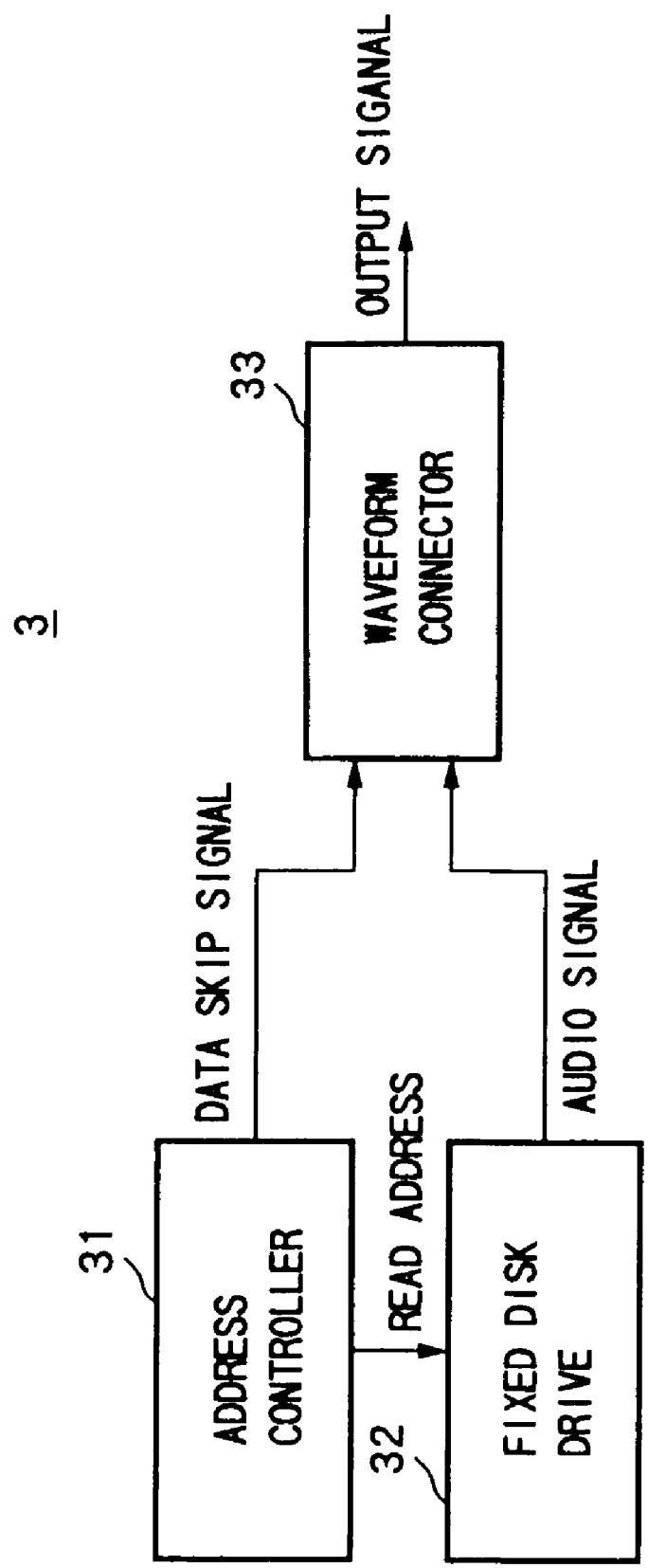
FIG. 28 is a view of the configuration of a magnetic disk apparatus according to a fourth embodiment of the present invention.

FIG. 28 is a view of the hardware configuration of a magnetic disk apparatus taking into account the above circumstances.

The magnetic disk apparatus 3 has an address controller 31, a fixed disk drive 32, and a waveform connector 33.

The fixed disk drive 32 stores the audio signal and the video signals as digital data. At the time of reproduction, the data is read according to the address designated by the address controller 31 and input to the waveform connector 33.

The address controller 31 compares the reproduction speed designated by the user and the reading speed of the fixed disk, determines the data read segments and the nonread segments so as to be within the range of the read speed, and designates the read addresses to the fixed data drive 32 accordingly. Further, it generates a data skip signal at the end of continuous read segments (immediately before a nonread segment) and inputs the same to the waveform connector 33.

FIGS. 29A, 29B, 29C, and 29D are graphs of the operation timing of the magnetic disk apparatus 3.

For convenience, assume that successive recording data (FIG. 29A) given numbers D1 to D15 are recorded in the fixed disk drive 32.

At the time of reproduction, assume that the address controller determines the read segments and the nonread segments as illustrated in FIG. 29B. At that time, the data actually read from the fixed disk drive 32 become as illustrated in FIG. 29C, and discontinuity of data occurs between D5 and DB and between D12 and D15. The data skip signal generated by the address controller 31 detecting such discontinuity becomes as shown in FIG. 29D.

The waveform connector 33 has the equivalent circuit configuration to the waveform connector 23 illustrated in FIG. 26.

Accordingly, the waveform connector 33 receiving the data skip signal from the address controller 31 performs repair processing similar to that explained above for the audio signal input from the fixed disk drive 32.

As explained above, the present invention is not limited to the high speed reproduction of an audio signal recorded on a recording medium like a magnetic tape and can be applied to also the high speed reproduction of an audio signal recorded on a random access type recording medium such as a magnetic disk and an optical disk.

Further, the present invention is not limited to the embodiments explained above. The present invention can be applied to various other types of audio signal processing apparatuses. As such audio signal processing apparatuses, there are the compact disk players, MD players, DVD players, etc.

The present invention can not only be applied to apparatuses such as Hi-Fi video apparatuses, digital video signal recording and/or reproducing apparatuses, 8 mm video apparatuses, and magnetic disk apparatuses, but also can use elements configuring these apparatuses alone.

For example, the waveform connectors 15, 23, and 33 shown in the various embodiments are not limited to the waveform connection of the audio signals explained above, but can also be applied to other signal processing.

Summarizing the effects of the present invention, the audio signal processing method and the audio signal processing apparatus of the present invention delete the audio signal in the noise segment due to shot noise superposed on the signal, signal skip, and discontinuity and smoothly connect the waveform before and after the deletion. Particularly, it can keep the time discrepancy from the original audio signal to a minimum level by inserting a pseudo waveform into the signal.

The audio signal processing apparatuses such as Hi-Fi video apparatuses, digital video signal recording and/or reproducing apparatuses, 8 mm video apparatuses, and magnetic disk apparatuses can reproduce a high quality audio signal with little incongruity by eliminating the influence of the sound skip (skip) occurring at the time of high speed reproduction, the noise at the switching of the heads, etc.

As a result, for example, in a Hi-Fi video apparatus, even when trying to save time while fully viewing and listening to the content by reproduction at 1.2× speed, a high quality audio signal can be reproduced. In a magnetic disk apparatus, it becomes possible to obtain a greater margin in the access time and therefore perform time division processing with other tasks without exceeding the limit of the access time.

What is claimed is:

1. A digital video apparatus which digitally records and reproduces a video signal and an audio signal by means of a rotary video head and a rotary audio head, the rotary heads respectfully including a rotary head A and a rotary head B arranged facing each other at 180 degrees, comprising:
   a detecting means for detecting a track skip at the time of high speed reproduction, the detecting means determining a track skip occurrence by comparing an ID number of a succeeding track from a head signal with an ID number of a preceding track reproduced immediately before said succeeding track;
   a deleting means for deleting a discontinuity or noise occurring in a digital video signal caused by a track skip when a track skip is detected by deleting a segment of said digital video signal;
   an audio signal generating means for generating an audio signal corresponding to a correct audio signal, a correct audio signal is being deduced by referring to a waveform of the audio signal before and after said deleted segment of said digital video signal; and
   a signal connecting means for inserting said generated audio signal for said correct audio signal and connecting said inserted audio signal and the audio signal before and after the deleted segment,
   wherein,
   a correlation function for the audio signal before and after said deleted segment is calculated and referred to in order to evaluate the similarity of the audio signal before and after said deleted segment.

* * * * *